(12) United States Patent
Nishino et al.

(10) Patent No.: US 7,824,797 B2
(45) Date of Patent: Nov. 2, 2010

(54) BATTERY UNIT

(75) Inventors: Haruchika Nishino, Okazaki (JP); Takeshi Ibuki, Anjo (JP); Seiichi Takasaki, Okazaki (JP)

(73) Assignees: Mitsubishi Jidosha Kogyo Kabushiki Kaisha, Tokyo (JP); Mitsubishi Jidosha Engineering Kabushiki Kaisha, Okazaki-Shi, Aichi (JP)

( * ) Notice: Subject to any disclaimer, the term of this patent is extended or adjusted under 35 U.S.C. 154(b) by 0 days.

(21) Appl. No.: 12/411,959

(22) Filed: Mar. 26, 2009

(65) Prior Publication Data

US 2009/0186266 A1    Jul. 23, 2009

Related U.S. Application Data

(63) Continuation of application No. PCT/JP2008/054806, filed on Mar. 14, 2008.

(30) Foreign Application Priority Data

Sep. 28, 2007    (JP) .............................. 2007-256208

(51) Int. Cl.
*H01M 2/24* (2006.01)
*H01M 2/22* (2006.01)
*H01M 2/02* (2006.01)
*H01M 2/00* (2006.01)

(52) U.S. Cl. ...................... 429/163; 429/160; 429/154; 429/156

(58) Field of Classification Search ...................... None
See application file for complete search history.

(56) References Cited

U.S. PATENT DOCUMENTS 6,094,927 A    8/2000    Anazawa et al.

FOREIGN PATENT DOCUMENTS

| JP | 07-101297 | * | 4/1995 |
| JP | 7-101297 A | | 4/1995 |
| JP | 2758348 B2 | | 3/1998 |
| JP | 11-180168 | * | 7/1999 |
| JP | 11-180168 A | | 7/1999 |
| JP | 2006-140025 A | | 6/2006 |

* cited by examiner

*Primary Examiner*—Dah-Wei Yuan
*Assistant Examiner*—Angela J. Martin
(74) *Attorney, Agent, or Firm*—Birch, Stewart, Kolasch & Birch, LLP

(57) ABSTRACT

A battery unit comprises a battery case, and a plurality of battery modules stored and held in the battery case. The battery case includes a bottom wall and a partition. The plurality of battery modules are mounted on the bottom wall. The partition is provided and erected on the bottom wall. The partition separates the battery modules adjacent in a second direction traversing a first direction. The first direction is oriented from a first end of the battery case at which an inlet is formed to a second end at which an outlet is formed. The partition extends along a plane where the battery modules face each other in the second direction along the battery modules. The partition is inclined in the extending direction.

3 Claims, 18 Drawing Sheets

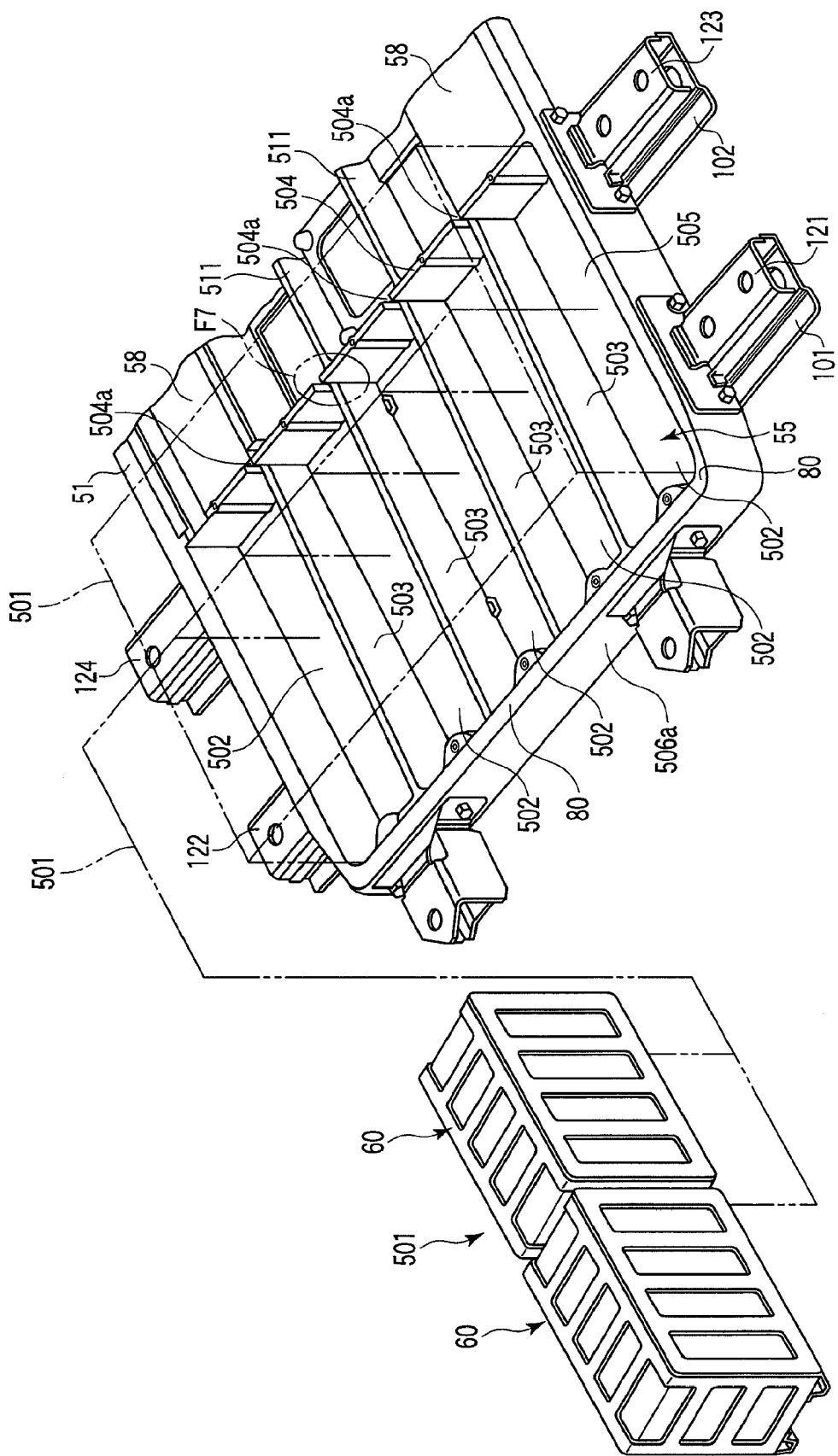
F I G. 6

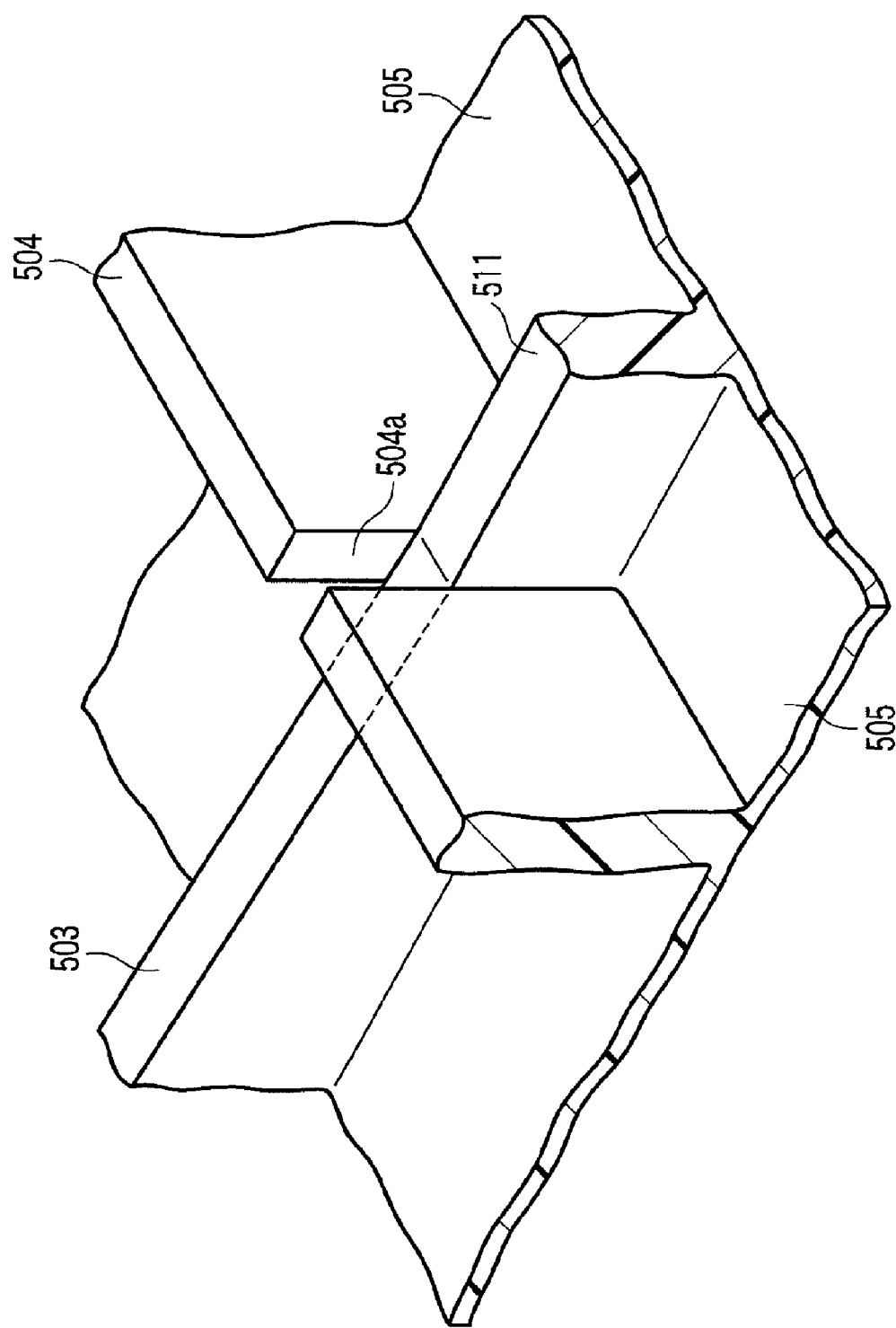
F I G. 7

BATTERY UNIT

CROSS REFERENCE TO RELATED APPLICATIONS

This is a Continuation Application of PCT Application No. PCT/JP2008/054806, filed Mar. 14, 2008, which was published under PCT Article 21(2) in Japanese.

This application is based upon and claims the benefit of priority from prior Japanese Patent Application No. 2007-256208, filed Sep. 28, 2007, the entire contents of which are incorporated herein by reference.

BACKGROUND OF THE INVENTION

1. Field of the Invention

The present invention relates to a battery unit used as a power supply for, for example, an electric vehicle.

2. Description of the Related Art

An electric vehicle is equipped with a battery unit as a power supply for running. The battery unit comprises a battery module, a battery case for storing the battery module, etc. The battery case of the battery unit of this type includes a battery carrier for storing a battery, and a battery carrier cover for covering the battery carrier.

Lattice-shaped projections are formed in the bottom of the battery carrier so that a plurality of batteries are held in a fitted state. Each battery module is stored in a recess defined by the projections. Each battery module stored in the battery carrier is held between the battery carrier and the battery carrier cover. A structure of this type is disclosed in Japanese Patent No. 2758348.

At the same time, the battery needs to be charged. There are two ways of charging; one of which is a quick charge for charging in a short time, and the other uses, for example, a domestic power source, which takes more time for charging than the quick charge.

The battery module generates heat when the battery is charged. In particular, one great challenge for the electric vehicle is how to increase the mileage. Therefore, the largest possible battery unit (including a plurality of battery modules) tends to be mounted. Thus, in the case of the quick charge which completes charging in a short time, the calorific value of the battery tends to be high because the battery is charged using a high-current power supply. An increased calorific value of the battery leads to deterioration of the battery and is therefore not preferable.

The battery case is provided with a fan as a structure for cooling off the battery module while the electric vehicle is running. While the electric vehicle is running, the fan is driven to bring air into the battery case. Each battery is cooled off by the air brought in. A structure of this type is disclosed in Japanese Patent No. 2758348.

In order to improve the rigidity of the battery case, the lattice-shaped projections formed in the bottom of the battery carrier may be increased in height. However, if the projections are increased in height, the area of each battery module covered with the projections is increased. Accordingly, the area of each battery module in contact with the air brought into the battery case decreases. A decreased area of each battery module in contact with the air is not preferable in terms of the cooling of the battery module.

BRIEF SUMMARY OF THE INVENTION

It is therefore an object of the present invention to provide a battery unit capable of maintaining sufficient rigidity of a battery case and also efficient cooling of a battery.

A battery unit according to an aspect of the present invention comprises a battery case having an inlet to let in a cooling gas and an outlet to let out the gas, and a plurality of battery modules stored and held in the battery case. The battery case includes a bottom wall and partition. The plurality of battery modules are mounted on the bottom wall. The partition is provided on the bottom wall. The partition separates the battery modules adjacent in a second direction traversing a first direction. The first direction is oriented from a first end of the battery case at which the inlet is formed to a second end at which the outlet is formed. The partition extends in a plane where the battery modules face each other in the second direction along the battery modules. The partition is inclined in the direction of extension.

According to this structure, the rigidity of the battery case is maintained, and at the same time, the range of the battery module covered with the partitions can be reduced. Thus, the area of contact between the battery module and the cooling gas can be increased.

Consequently, it is possible to provide a battery unit capable of maintaining sufficient rigidity of a battery case and also efficient cooling of a battery.

In a preferred embodiment of the present invention, the partition may become gradually lower toward the center of the battery case in the first direction.

In a further preferred embodiment of the present invention, a plurality of partitions identical to the partition are provided. An inlet side battery module group and an outlet side battery module group may be arranged in the battery case, the inlet side battery module group including a plurality of battery modules disposed on the side of the first end, the outlet side battery module group including a plurality of battery modules disposed on the side of the second end. A partition of the plurality of partitions, which separate the battery modules in the inlet side battery module group may become gradually lower toward the center of the battery case in the first direction. A partition of the plurality of partitions, which separate the battery modules in the outlet side battery module group may become gradually lower toward the center of the battery case.

BRIEF DESCRIPTION OF THE SEVERAL VIEWS OF THE DRAWING

FIG. 6 is a perspective view showing in an enlarged manner a front battery storage shown in FIG. 5;

FIG. 7 is a perspective view showing in an enlarged manner a range of F7 shown in FIG. 6;

DETAILED DESCRIPTION OF THE INVENTION

Figure 1:
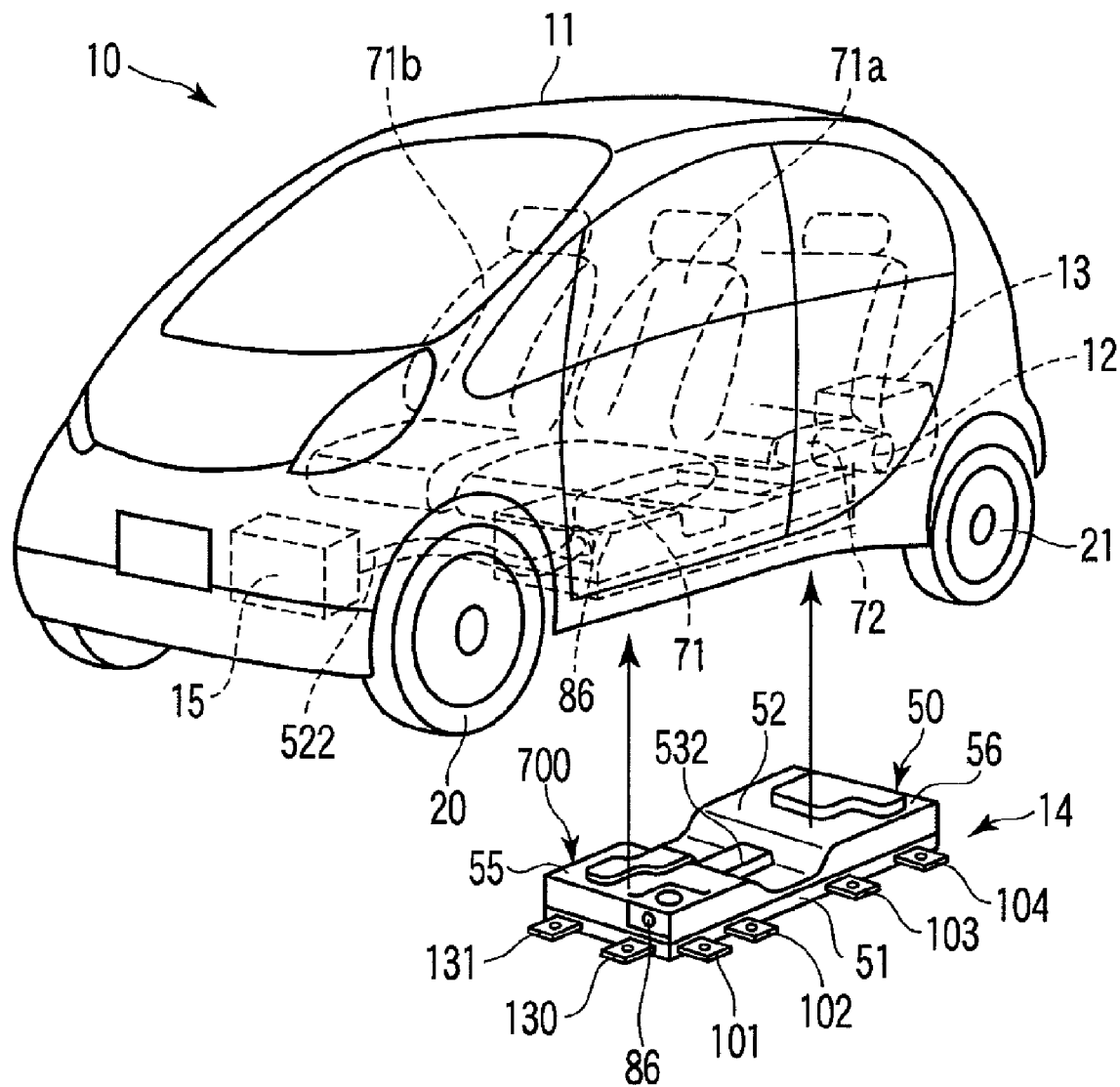
FIG. 1 is a perspective view showing an electric vehicle equipped with a battery unit according to one embodiment of the present invention.

A battery unit according to one embodiment of the present invention is described with FIGS. 1 to 20. FIG. 1 shows one example of an electric vehicle 10. As shown in FIG. 1, the electric vehicle 10 comprises a motor 12 for driving and a charger 13 that are arranged in the rear part of a vehicle body 11, a battery unit 14 disposed under the floor of the vehicle body 11, etc. The battery unit 14 is located ahead of the motor 12. An air-conditioning heat exchanger unit 15 is disposed in the front part of the vehicle body 11. In addition, the motor 12 is not exclusively positioned in the rear part of the vehicle body 11. For example, the motor 12 may be disposed in the front part of the vehicle body 11.

A front wheel 20 of the electric vehicle 10 is supported on the vehicle body 11 by an unshown front suspension. A rear wheel 21 is supported on the vehicle body 11 by an unshown rear suspension.

Figure 2:
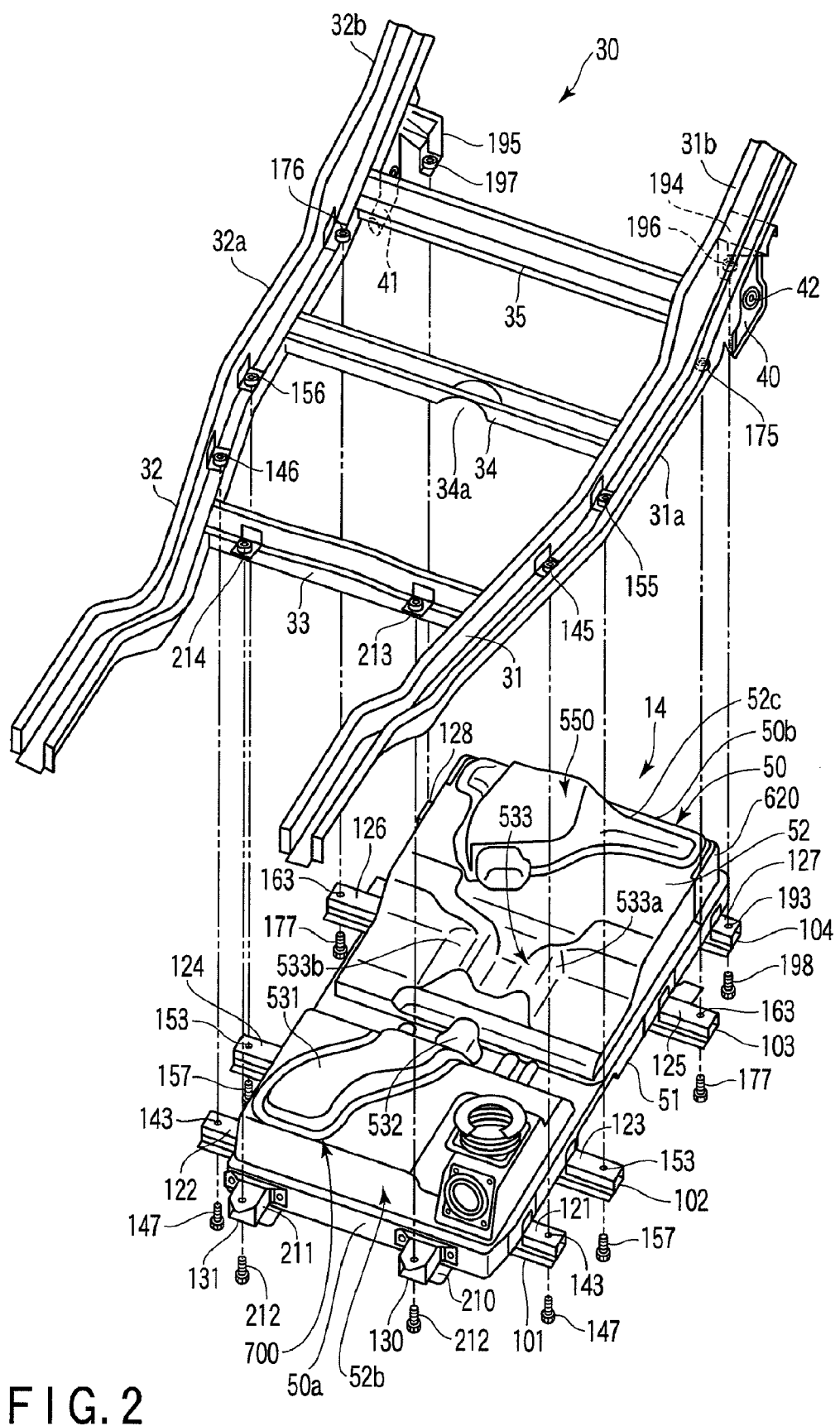
FIG. 2 is a perspective view showing a frame body structure and the battery unit of the electric vehicle shown in FIG. 1.
Figure 3:
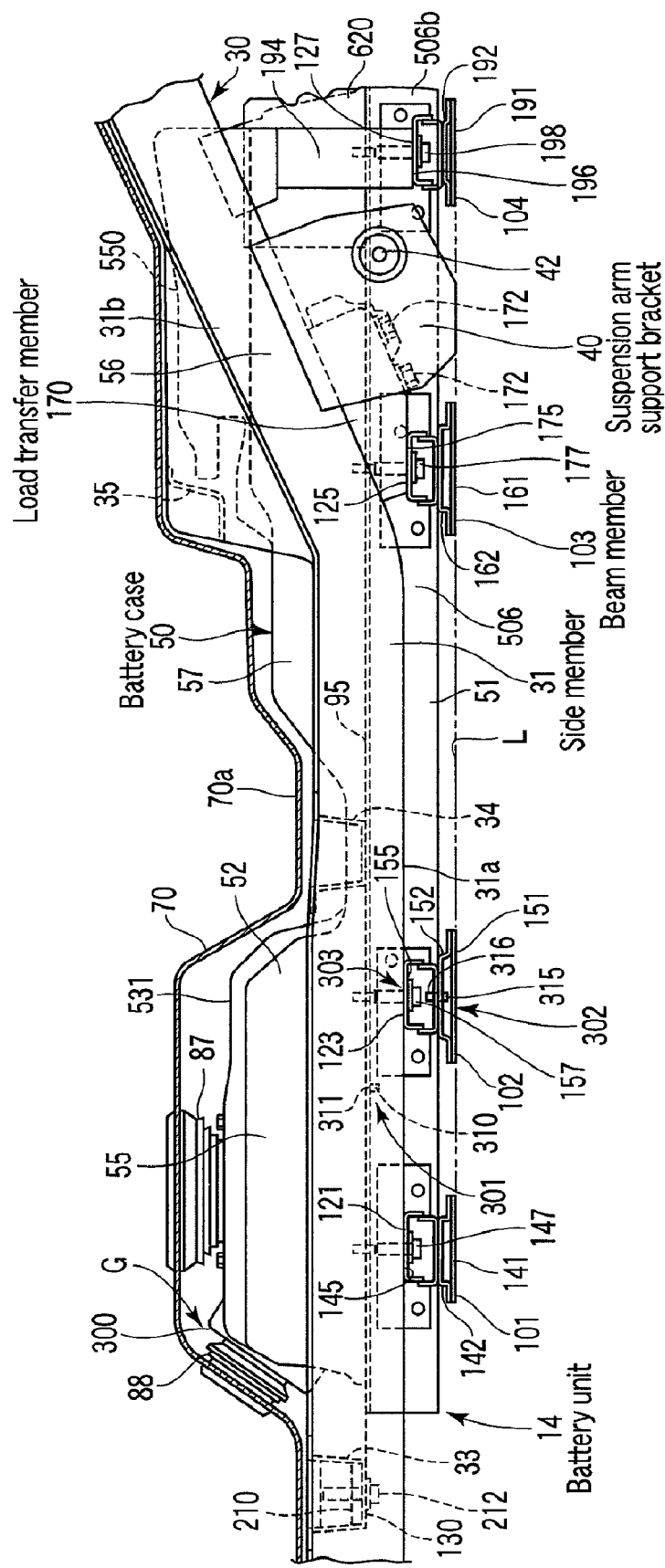
FIG. 3 is a side view showing the frame body structure and the battery unit of the electric vehicle shown in FIG. 1.
Figure 4:
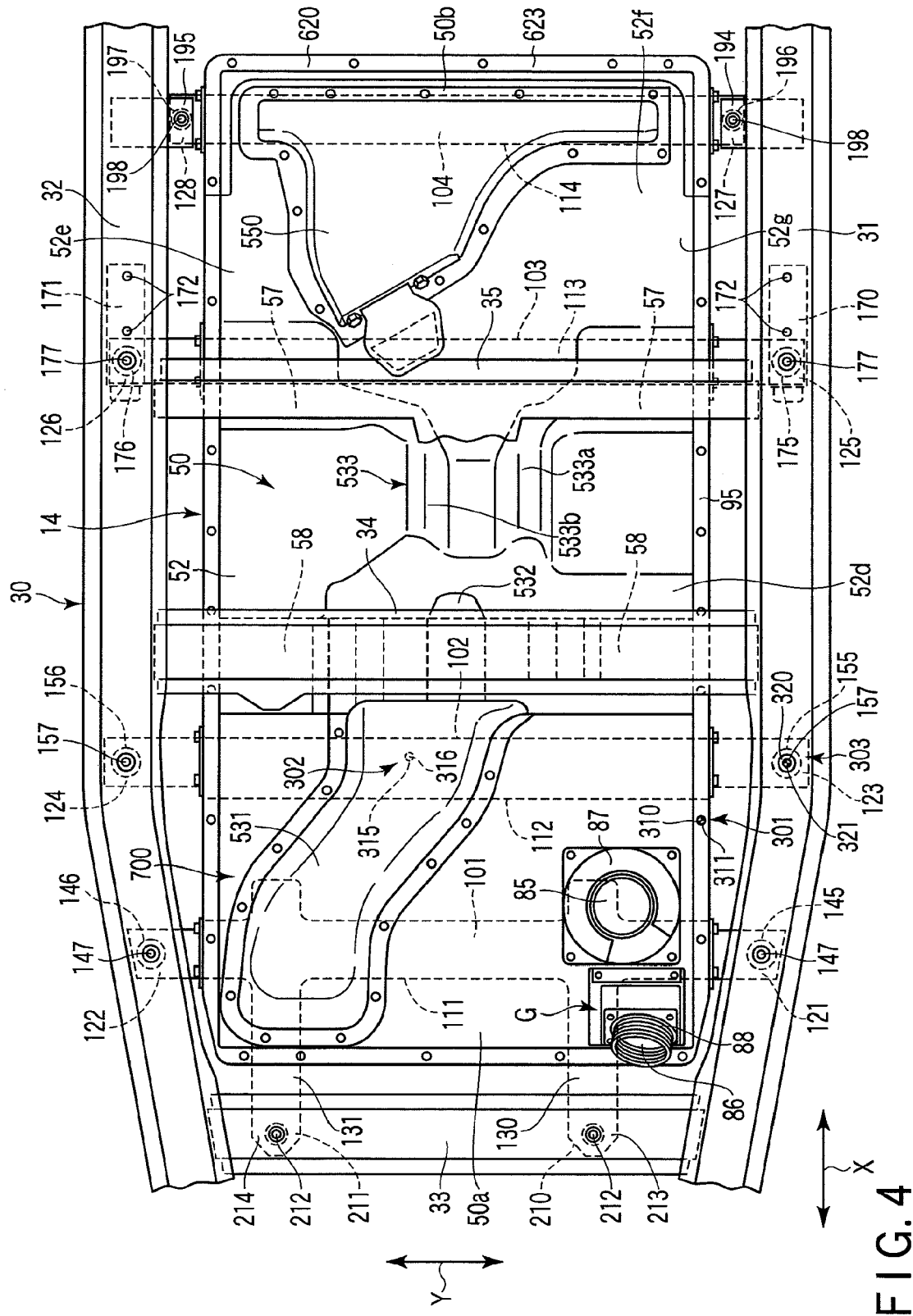
FIG. 4 is a plan view showing the frame body structure and the battery unit of the electric vehicle shown in FIG. 1.

FIG. 2 shows the battery unit 14 separated from a frame body structure 30 which forms the frame structure of the lower part of the vehicle body 11. FIG. 3 is a side view showing the vehicle body 11 in which the battery unit 14 is fixed to the frame body structure 30. FIG. 4 is a plan view showing the frame body structure 30 to which the battery unit 14 is fixed.

As shown in FIGS. 2 to 4, the frame body structure 30 includes a pair of left and right side members 31, 32 extending in the front-back direction of the vehicle body 11, and cross members 33, 34, 35 extending in the width direction of the vehicle body 11. The cross members 33, 34, 35 are fixed by welding at predetermined positions of the side members 31, 32 in order from the front.

Figure 5:
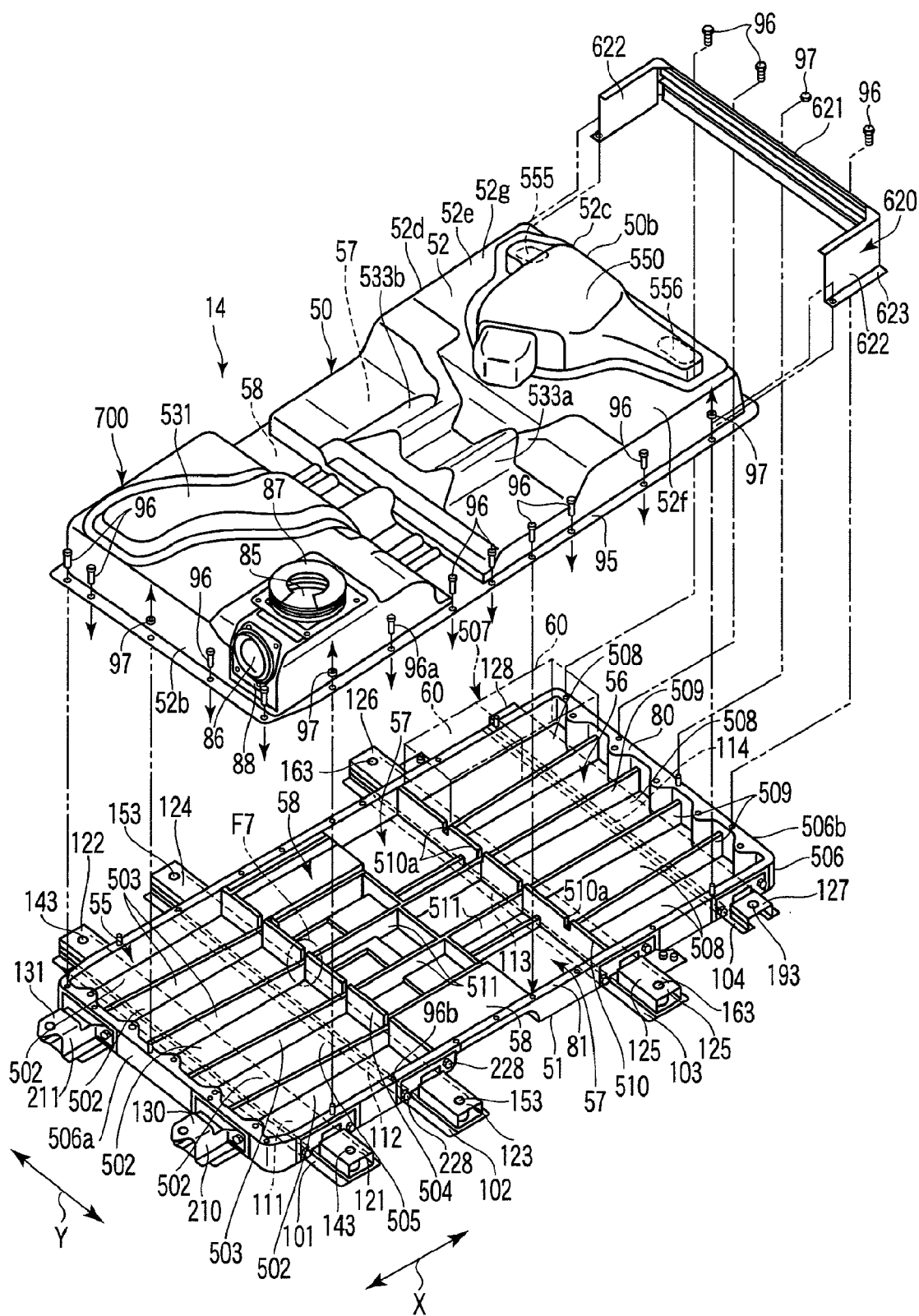
FIG. 5 is a perspective view showing in an exploded manner the battery unit shown in FIG. 1.

FIG. 5 is a perspective view showing the battery unit 14 in an exploded manner. As shown in FIG. 5, the battery unit 14 includes a battery case 50, a plurality of battery modules 60 (some of which are shown in FIG. 6) stored in the battery case 50, a monitor for detecting the state of the battery modules 60, and electric components (not shown) for control.

The top, bottom, front, rear, right and left of the battery unit 14 correspond to the top, bottom, front, rear, right and left of the vehicle body 11 when the battery unit 14 is fixed to the frame body structure 30. That is, the vertical direction, front-back direction and width direction (lateral direction) of the battery unit 14 are the same as the vertical direction, front-back direction and width direction of the vehicle body 11.

The battery case 50 includes a tray member 51 located in the lower part, and a cover member 52 located in the upper part. The planar shape of the battery case 50 is substantially rectangular. At a front end 52b of the cover member 52, a cooling air inlet 86 (described later in detail) is formed to let cooling air G into the battery case 50. In addition, the cooling air G is one example of a cooling gas referred to in the present invention. Moreover, at a rear end 52c of the cover member 52, first and second outlets 555, 556 (described later in detail) are formed to let out the air inside the battery case 50.

In addition, a front end 50a of the battery case 50 is one example of a first end referred to in the present invention at which the cooling air inlet 86 is formed. A rear end 50b of the battery case 50 is one example of a second end referred to in the present invention at which the first and second outlets 555, 556 are formed. Further, a front-back direction X is one example of a first direction referred to in the present invention, and a width direction Y (lateral direction) is one example of a second direction referred to in the present invention.

A front battery storage 55 is formed in the front half of the battery case 50. A rear battery storage 56 is formed in the rear half of the battery case 50. Central battery storages 57, electric circuit storages 58, etc. are formed between the front battery storage 55 and the rear battery storage 56.

As shown in FIG. 3, the battery case 50 is shaped so that the central battery storages 57 and the electric circuit storages 58 are recessed lower than the front battery storage 55 and the rear battery storage 56. Therefore, the parts of the cover member 52 corresponding to the central battery storages 57 and the electric circuit storages 58 are recessed downward.

The battery unit 14 will be described in detail later. First, a structure of fixing the battery unit 14 to the frame body structure 30 is described.

As shown in FIG. 3, the battery unit 14 is disposed on the lower side of a floor panel 70. The floor panel 70 is fixed by welding at a predetermined position of the frame body structure 30 including the side members 31, 32.

As shown in FIG. 1, a front seat 71 and a rear seat 72 are arranged on the floor panel 70. The front battery storage 55 of the battery unit 14 is disposed under the front seat 71 (including a driver's seat 71b and a the seat next to the driver 71a). The rear battery storage 56 of the battery unit 14 is disposed under the rear seat 72. A recess 70a of the floor panel 70 formed between the front battery storage 55 and the rear battery storage 56 is located in the vicinity of a foot space for a passenger sitting on the rear seat 72.

A plurality of (e.g., four) beam members 101, 102, 103, 104 are provided on the lower side of the tray member 51. As shown in FIG. 5, the beam members 101, 102, 103, 104 have beam bodies 111, 112, 113, 114 extending in the width direction of the vehicle body 11, respectively.

Fastening portions 121, 122 are provided at both ends of the first beam body 111 from the front. Fastening portions 123, 124 are provided at both ends of the second beam body 112 from the front. Fastening portions 125, 126 are provided at both ends of the third beam body 113 from the front. Fastening portions 127, 128 are provided at both ends of the fourth (rearmost) beam body 114 from the front.

The beam members 101, 102, 103, 104 are fixed to the lower surface of the tray member 51 by unshown bolts. The tray member 51 is provided with nuts (not shown) to which the bolts are screwed.

The beam members 101, 102, 103, 104 are made of a metal material (e.g., steel plate) strong enough to bear the load of the battery unit 14. More specifically, as shown in FIGS. 3 and 4, the first beam member 101 from the front has a metal lower plate 141, an upper plate 142 hat-shaped in section, and the above-mentioned fastening portions 121, 122 provided at both ends of the upper plate 142. The beam body 111 is formed by the lower plate 141 and the upper plate 142. Bolt insertion holes 143 (shown in FIG. 2 and FIG. 5) are formed vertically through the fastening portions 121, 122.

The side members 31, 32 are provided with battery unit attaching portions 145, 146 having nut members at positions opposite to the fastening portions 121, 122. Bolts 147 (shown in FIGS. 2 and 3) are inserted into the bolt insertion holes 143 from the lower side of the fastening portions 121, 122, and the bolts 147 are screwed and fastened to the nut members of the battery unit attaching portions 145, 146, such that the fastening portions 121, 122 of the first beam member 101 are fixed to the side members 31, 32.

As shown in FIGS. 3 and 4, the second beam member 102 from the front has a metal lower plate 151, an upper plate 152 hat-shaped in section, and the above-mentioned fastening portions 123, 124 provided at both ends of the upper plate 152. The beam body 112 is formed by the lower plate 151 and the upper plate 152. Bolt insertion holes 153 (shown in FIG. 2 and FIG. 5) are formed vertically through the fastening portions 123, 124.

The side members 31, 32 are provided with battery unit attaching portions 155, 156 having nut members at positions opposite to the fastening portions 123, 124. Bolts 157 (shown in FIGS. 2 and 3) are inserted into the bolt insertion holes 153 from the lower side of the fastening portions 123, 124, and the bolts 157 are screwed and fastened to the nut members of the battery unit attaching portions 155, 156, such that the fastening portions 122, 123 of the second beam member 102 are fixed to the side members 31, 32.

The third beam member 103 from the front has a metal lower plate 161, an upper plate 162 hat-shaped in section, and the above-mentioned fastening portions 125, 126 provided at both ends of the upper plate 162. The beam body 113 is formed by the lower plate 161 and the upper plate 162. Bolt insertion holes 163 (shown in FIG. 2 and FIG. 5) are formed vertically through the fastening portions 125, 126.

As shown in FIGS. 3 and 4, metal load transfer members 170, 171 are fixed to the side members 31, 32 by bolts 172, respectively. The load transfer members 170, 171 are provided at opposite positions above the fastening portions 125, 126 of the third beam member 103 from the front. One load transfer member 170 is welded to one suspension arm support bracket 40 of the rear suspension which supports the rear wheel 21. The other load transfer member 171 is welded to the other suspension arm support bracket (not shown).

In addition, the load transfer member 170 is shown in FIG. 3. The load transfer member 171 may be similar in structure to the load transfer member 170. The one suspension arm support bracket 40 is shown in FIG. 3. The other suspension arm support bracket (not shown) may be similar to the one suspension arm support bracket 40.

That is, the load transfer members 170, 171 are linked to the side members 31, 32 and the suspension arm support brackets 40, 41. The load transfer members 170, 171 form part of the frame body structure 30. The load transfer members 170, 171 are provided with battery unit attaching portions 175, 176 having nut members.

Bolts 177 are inserted into the bolt insertion holes 163 from the lower side of the fastening portions 125, 126, and the bolts 177 are screwed and fastened to the nut members of the battery unit attaching portions 175, 176, such that the fastening portions 125, 126 of the third beam member 103 are fixed to the side members 31, 32 via the load transfer members 170, 171.

The fourth beam member 104 from the front also has a metal lower plate 191, an upper plate 192 hat-shaped in section, and the above-mentioned fastening portions 127, 128 provided at both ends of the upper plate 192. The beam body 114 is formed by the lower plate 191 and the upper plate 192. Bolt insertion holes 193 (shown in FIG. 2 and FIG. 5) are formed vertically through the fastening portions 127, 128.

The side members 31, 32 are provided with extension brackets 194, 195 at positions opposite to the fastening portions 127, 128. The extension brackets 194, 195 extend under kick-up portions 31b, 32b of the side members 31, 32. The extension brackets 194, 195 form part of the frame body structure 30. The extension brackets 194, 195 are provided with battery unit attaching portions 196, 197 having nut members.

Bolts 198 (shown in FIGS. 2 and 3) are inserted into the bolt insertion holes 193 from the lower side of the fastening portions 127, 128, and the bolts 198 are screwed and fastened to the nut members of the battery unit attaching portions 196, 197 of the extension brackets 194, 195, such that the fastening portions 127, 128 of the fourth beam member 104 are fixed to the side members 31, 32 via the extension brackets 194, 195.

As shown in FIG. 3, the lower surfaces of the beam members 101, 102, 103, 104 are located on the same horizontally extending plane L along the flat lower surface of the tray member 51. The first and second beam members 101, 102 are directly fixed to the battery unit attaching portions 145, 146, 155, 156 provided at horizontal portions 31a, 32a of the side members 31, 32.

The third beam member 103 and the fourth beam member 104 are fixed to the battery unit attaching portions 175, 176, 196, 197 provided at the kick-up portions 31b, 32b of the side members 31, 32.

The third and fourth beam members 103, 104 are located at offset positions under the kick-up portions 31b, 32b. Thus, the third beam member 103 is fixed to the battery unit attaching portions 175, 176 via the load transfer members 170, 171 having a thickness in the vertical direction. The fourth beam member 104 is fixed to the battery unit attaching portions 196, 197 by the extension brackets 194, 195 extending under the kick-up portions 31b, 32b.

In the electric vehicle 10 in the present embodiment, the beam members 101, 102, 103, 104 are provided across the left and right side members 31, 32, and the side members 31, 32 are linked together by the beam members 101, 102, 103, 104. Thus, the beam members 101, 102, 103, 104 of the battery unit 14 function as rigid members corresponding to the cross members.

Next, the battery unit 14 is specifically described.

As described above, the battery unit 14 includes the battery case 50, the battery modules 60 (some of which are shown in FIG. 6), the monitor for detecting the state of the battery modules 60, the electric components (not shown) for control, a plurality of ribs 523, a bypass duct cover 531, a fan unit 550 and a battery protector 620.

The tray member 51 is a molded article in which a reinforcing metal plate is inserted into an integrally molded synthetic resin. The tray member 51 is molded into a box shape with an open upper side. The synthetic resin, which is the material of the tray member 51, is reinforced by, for example, fiber. The planar shape of the tray member 51 is substantially rectangular.

As shown in FIG. 5, a cover attachment surface 80 is formed on the peripheral edge of the upper surface of the tray member 51. The cover attachment surface 80 is continuous over the whole circumference of the tray member 51. A waterproof seal member (not shown) is provided on the cover attachment surface 80.

The cover member 52 is made of an integrally molded article of a synthetic resin reinforced by fiber. The cover member 52 covers the opening at the upper end of the tray member 51. The cover member 52 is formed into a box shape opening on the side of the tray member 51. The planar shape of the cover member 52 is substantially rectangular.

A flange 95 is formed on the peripheral edge of the end of the opening in the cover member 52. The flange 95 is continuous over the whole circumference of the cover member 52. The flange 95 of the cover member 52 is mounted on the cover attachment surface 80 of the tray member 51, and the flange 95 and the cover attachment surface 80 are watertightly fixed together by bolts 96 or nuts 97 via the seal member interposed between the tray member 51 and the cover member 52.

As shown in FIG. 5, the front battery storage 55, the rear battery storage 56, the central battery storages 57 and the electric circuit storages 58 are formed in the battery case 50.

A front battery module group 501 is disposed in the front battery storage 55. The front battery module group 501 is composed of a plurality of battery modules 60. A plurality of front battery storage chambers 502 are formed in the front battery storage 55. Each of the front battery storage chambers 502 is formed by a plurality of front longitudinal partitions 503 and a front widthwise partition 504.

The front longitudinal partitions 503 are formed on a bottom wall 505, and arranged separately from each other in the width direction so that these partitions are erected from the bottom wall 505 of the tray member 51. Moreover, each of the front longitudinal partitions 503 extends rearward with its one end coupled to a front end 506a of a peripheral wall 506 of the tray member 51. In the present embodiment, for example, four front longitudinal partitions 503 are used. The front longitudinal partitions 503 are one example of partitions referred to in the present invention.

The front widthwise partition 504 is provided on the bottom wall 505 in the vicinity of the rear ends of the front longitudinal partitions 503. The front widthwise partition 504 is erected from the bottom wall 505 and extends from one end to the other in the vehicle width direction of the tray member 51 so that both ends of the front widthwise partition 504 are coupled to the peripheral wall 506. The rear ends of the front longitudinal partitions 503 are coupled to the front widthwise partition 504.

As described above, spaces defined between the peripheral wall 506 of the tray member 51, the front longitudinal partitions 503 and the front widthwise partition 504 serve as the front battery storage chambers 502. In the present embodiment, five front battery storage chambers 502 are formed side by side in the width direction. In addition, the number of the front battery storage chambers 502 is not limited to five.

FIG. 6 shows the front battery storage 55 in an enlarged manner. As shown in FIG. 6, the battery modules 60 are stored in each of the front battery storage chambers 502. In the present embodiment, the front battery storage chamber 502 is formed to be long in the front-back direction, and stores two battery modules 60 in the front-back direction. Moreover, the breadth of the front battery storage chamber 502 in the width direction is sized so that one battery module 60 is stored. The front longitudinal partitions 503 are inclined to become gradually lower rearward.

The position of the upper surface of the front widthwise partition 504 is set to be flush with, for example, the cover attachment surface 80 of the tray member 51. Thus, the upper surfaces of the rear ends (parts coupled to the front widthwise partition 504) of the front longitudinal partitions 503 are lower than the upper surface of the front widthwise partition 504.

FIG. 7 is a perspective view showing in an enlarged manner a range of F7 shown in FIG. 6. FIG. 7 shows a part where the front longitudinal partition 503 and the front widthwise partition 504 are coupled together. As shown in FIG. 7, the part of the front widthwise partition 504 coupled to the front longitudinal partition 503 is cut to the position of the upper surface of the front longitudinal partition 503. This cut 504a penetrates in the front-back direction.

As shown in FIG. 5, a rear battery module group 507 (part of which is shown) is stored in the rear battery storage 56. The rear battery module group 507 is composed of the plurality of battery modules 60. A plurality of rear battery storage chambers 508 are formed in the rear battery storage 56. Each of the rear battery storage chambers 508 is formed by a plurality of rear longitudinal partitions 509 and a rear widthwise partition 510.

The rear longitudinal partitions 509 are formed on the bottom wall 505, and arranged separately from each other in the width direction and erected. Moreover, each of the rear longitudinal partitions 509 extends forward with its one end coupled to a rear end 506b of the peripheral wall 506 of the tray member 51. In the present embodiment, for example, four rear longitudinal partitions 509 are used. The rear longitudinal partitions 509 are one example of partitions referred to in the present invention.

The rear widthwise partition 510 is provided on the bottom wall 505 in the vicinity of the front ends of the rear longitudinal partitions 509. The rear widthwise partition 510 is erected from the bottom wall 505 and extends from one end to the other in the width direction of the tray member 51 so that both ends of the rear widthwise partition 510 are coupled to the peripheral wall 506. The front ends of the rear longitudinal partitions 509 are coupled to the rear widthwise partition 510.

As described above, spaces defined between the peripheral wall 506 of the tray member 51, the rear longitudinal partitions 509 and the rear widthwise partition 510 serve as the rear battery storage chambers 508. In the present embodiment, five rear battery storage chambers 508 are formed side by side in the width direction. Similarly to the front battery storage chamber 502, the rear battery storage chamber 508 is formed so that two battery modules 60 arranged in the front-back direction are stored therein. In addition, the number of the rear battery storage chambers 508 is not limited to five. The rear longitudinal partitions 509 are inclined to become gradually lower forward.

The position of the upper surface of the rear widthwise partition 510 is set to be flush with, for example, the cover attachment surface 80 of the tray member 51. Thus, the upper surfaces of the front ends (parts coupled to the rear widthwise partition 510) of the rear longitudinal partitions 509 are lower than the upper surface of the rear widthwise partition 510. Thus, similarly to the front widthwise partition 504, the part of the rear widthwise partition 510 coupled to the rear longitudinal partition 509 is cut to the position of the upper surface of the rear longitudinal partition 509. This cut 510a penetrates in the front-back direction.

The front and rear longitudinal partitions 503, 509 and the front and rear widthwise partitions 504, 510 also function as reinforcing walls of the tray member 51. Thus, the heights of the front and rear longitudinal partitions 503, 509 and the front and rear widthwise partitions 504, 510 are set so that the rigidity necessary for the tray member 51 may be ensured.

However, the front and rear longitudinal partitions 503, 509 are inclined in the front-back direction, so that the areas of the side surfaces of the battery modules 60 covered with the front and rear longitudinal partitions 503, 509 are reduced.

As shown in FIG. 5, the central battery storages 57 and the electric circuit storages 58 are arranged between the front and rear widthwise partitions 504, 510. One electric circuit storage 58 is disposed at each of both right and left front ends. The central battery storages 57 are disposed behind the electric circuit storages 58, and one central battery storage 57 is disposed at each of both right and left ends.

A plurality of partitions extending in the front-back direction and width direction are formed to partition the central battery storages 57 and the electric circuit storages 58. Among these partitions, central longitudinal partitions 511 extending in the front-back direction are formed to be lower than the front and rear widthwise partitions 504, 510.

Furthermore, among the plurality of central longitudinal partitions 511, the central longitudinal partitions located at the positions where the cuts 504a of the front widthwise partitions 504 are coupled to the cuts 510a of the rear widthwise partitions 510 are formed to be flush with the lower ends of the cuts 504a, 510a. That is, as shown in FIG. 7, the front longitudinal partition 503 and the central longitudinal partition 511 are flush with and continuous to each other. Similarly, the rear longitudinal partition 509 and the central longitudinal partition 511 are flush with and continuous to each other. The cuts 504a, 510a are therefore not closed by the central longitudinal partitions 511.

In addition, a plurality of battery storage chambers are not formed in the central battery storage 57, and a plurality of unshown battery modules 60 are stored in the central battery storage 57. The electric circuit storages 58 store the monitor for detecting the state of the battery modules 60 and the electric components for control.

Figure 8:
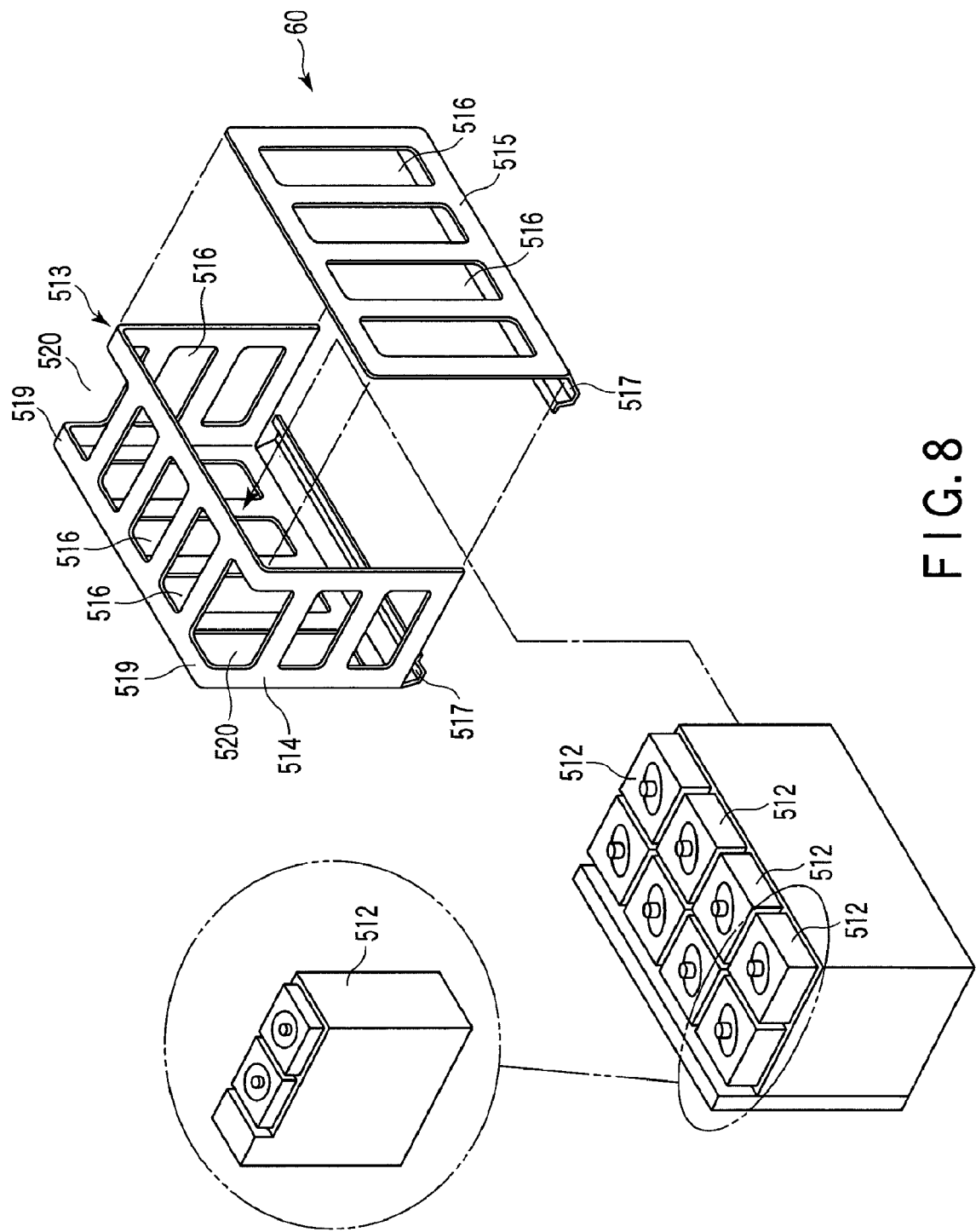
FIG. 8 is a perspective view showing in an exploded manner a battery module shown in FIG. 6.

FIG. 8 shows one battery module 60. As shown in FIG. 8, the battery module 60 includes four battery cells 512 composed of lithium ion batteries, and a cell holder 513 for holding the four battery cells 512. In addition, one battery cell 512 is shown in an enlarged manner within a zone indicated by a two-dot chain line in FIG. 8. The battery cells 512 are held by the cell holder 513 so that these battery cells are electrically connected to each other in series. The battery modules 60 are electrically connected to each other in series. In addition, the top, bottom, front, rear, right and left of the battery module 60 correspond to the top, bottom, front, rear, right and left of the battery unit 14 when this battery module 60 is disposed in the battery case 50.

The cell holder 513 has a holder body 514 and a lid 515. The holder body 514 is substantially in the shape of a rectangular parallelepiped. One of the widthwise side walls of the holder body 514 (side surface opposite to the peripheral wall 506 of the tray member 51 or the front and rear longitudinal partitions 503, 509) is open. Moreover, the lower end face of the holder body 514 is open.

The lid 515 removably covers the opening in the side surface of the holder body 514. The lid 515 is removed when battery cells 512 are stored in or taken out of the cell holder 513. A plurality of cooling holes 516 are formed in the wall surfaces of the holder body 514 and the lid 515 for cooling the cells.

Legs 517 to be in contact with the bottom wall 505 of the tray member 51 are formed at the lower end of the holder body 514 and the lower end of the lid 515. The legs 517 are formed, for example, in all the regions of the lower ends of the holder body 514 and the lid 515 in the front-back direction.

Figure 9:
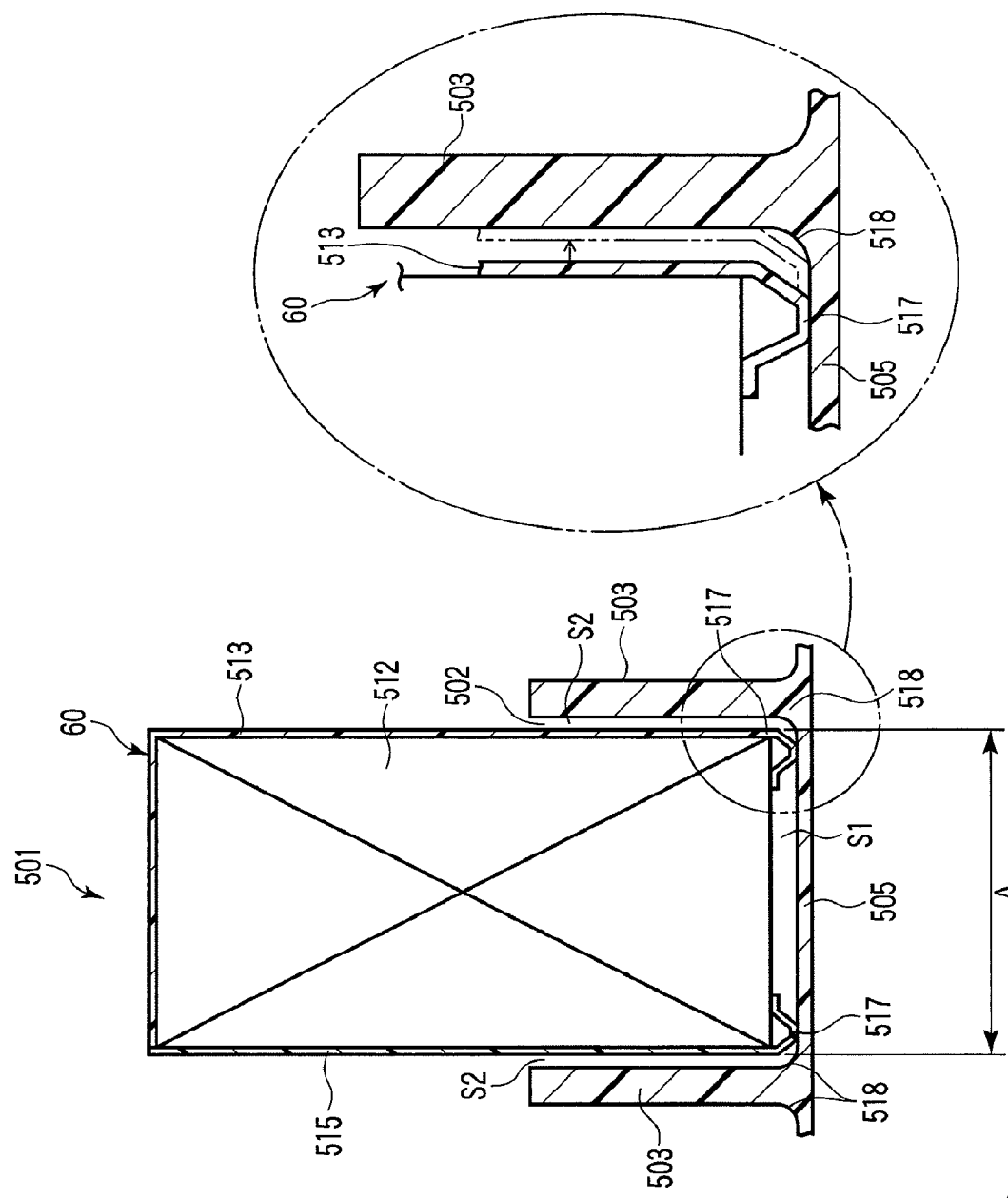
FIG. 9 is a sectional view through the front battery storage in a width direction when the battery modules are stored in the front battery storage shown in FIG. 6.

FIG. 9 is a sectional view of the vicinity of the tray member 51 in the width direction. FIG. 9 shows a section through the front battery storage 55 in the width direction when the battery modules 60 is stored in the front battery storage chamber 502.

As shown in FIG. 9, the legs 517 project inward in the battery module 60 in the width direction. Therefore, the positions of the legs 517 to be in contact with the bottom wall 505 are within a range A in which the bottom wall 505 faces the battery modules 60. Moreover, the legs 517 are shaped to extend and project downward, so that a space S1 is defined between the bottom wall 505 and each of the battery cells 512.

Here, the width of the front battery storage chamber 502 and a border 518 between the bottom wall 505 and the front longitudinal partition 503 are specifically described.

The width of the front battery storage chamber 502 is sized so that the tolerance of the shape of the battery module 60 is added to the width of the battery module 60. Thus, a slight space S2 may be present between the front longitudinal partition 503 and the battery module 60 as shown in FIG. 9. The border 518 between the bottom wall 505 and the front longitudinal partition 503 is continuous in the shape of a smooth arc. Therefore, when the tray member 51 is cast in a mold or injection-molded, the fluidity of a resin in a part corresponding to the border 518 improves in a mold (not shown) for molding the tray member 51.

The border 518 is shown in an enlarged manner within a zone indicated by a two-dot chain line in FIG. 9. As described above, the legs 517 are shaped to project inward in the width direction, so that the legs 517 avoid the borders 518 and thus do not interfere with the borders 518 even when, for example, the battery module 60 is fitted into the front battery storage chamber 502 in the width direction (when the battery module 60 is in contact with the front longitudinal partition 502 as indicated by a two-dot chain line in FIG. 9).

It is preferable that the legs 517 project inward in the width direction to such a degree that the legs 517 do not interfere with the borders 518 and to such a degree that the legs 517 are not located too far from the front longitudinal partitions 503 in the width direction (lateral direction). The legs 517 are not located far from the front longitudinal partitions 503 in the width direction such that the bottom wall 505 is inhibited from being deformed by the weight of the battery modules 60.

While the border 518 between the bottom wall 505 and the front longitudinal partition 503 and the width of the front battery storage chamber 502 have been described, the border between the bottom wall 505 and the rear longitudinal partition 509 is also smoothed. The width of the rear battery storage chamber 508 is also similar to the front battery storage chamber 502. Moreover, the border between the bottom wall 505 and the peripheral wall 506 of the tray member 51 (a border with a part in the front-back direction and a border with a part along the vehicle width direction) is also smoothed.

Figure 10:
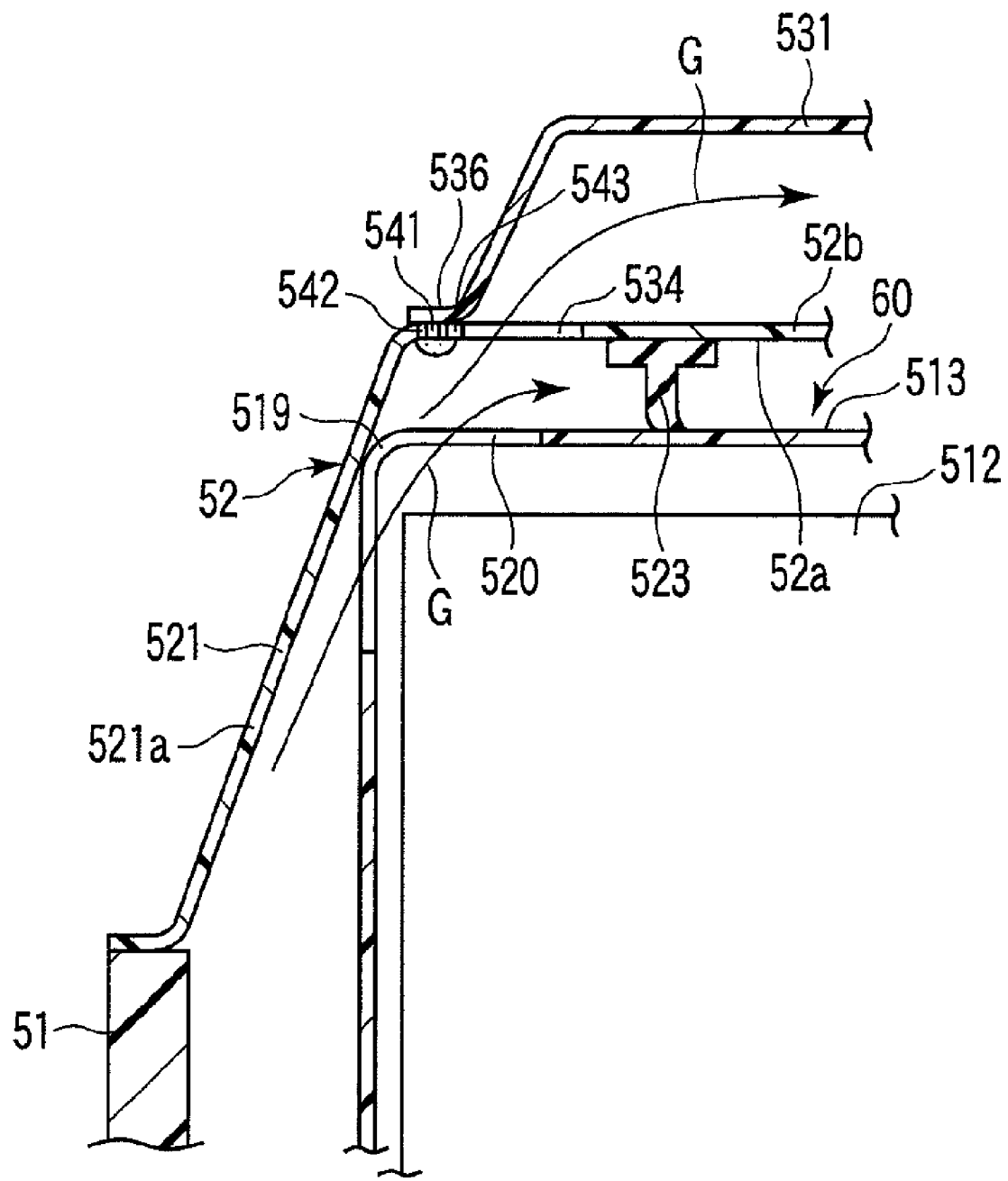
FIG. 10 is a sectional view through the upper end of the front battery storage shown in FIG. 6 in a front-back direction.

FIG. 10 is a section through the upper end of the front battery storage 55 in the front-back direction, and shows the front end of the cover member 52 and the front end of the battery module 60 located on the front side of the front battery storage 55.

As shown in FIGS. 8 and 10, cuts 520 are formed in upper corners 519 at the front and rear ends of the holder body 514 of the battery module 60. The cooling holes 516 are disposed in the corners 519 to form the cuts 520.

As shown in FIG. 10, a front end 521a of a peripheral wall 521 of the cover member 52 extends rearward in the upward direction and is therefore inclined. Thus, even if the corner 519 of the cell holder 513 comes into contact with the inner surface of the front end 521*a* of the peripheral wall 521 of the cover member 52, air flows through the cut 520 formed in the corner 519 as indicated by arrows in FIG. 10, so that the flow of the cooling air in the battery case 50 is not blocked by the battery module 60.

Although the cuts 520 are formed in the corners 519 at the front and rear ends of the cell holder 513 in the exemplar described in the present embodiment, similar cuts may be formed in upper corners of the cell holder 513 in the width direction (lateral direction). In this case, even when the inner surfaces of the right and left ends of the peripheral wall 521 of the cover member 52 come into contact with the widthwise corners of the cell holder 513, air flows through the cuts formed in the widthwise corners, so that the flow of the cooling air in the battery case 50 is not blocked.

Figure 11:
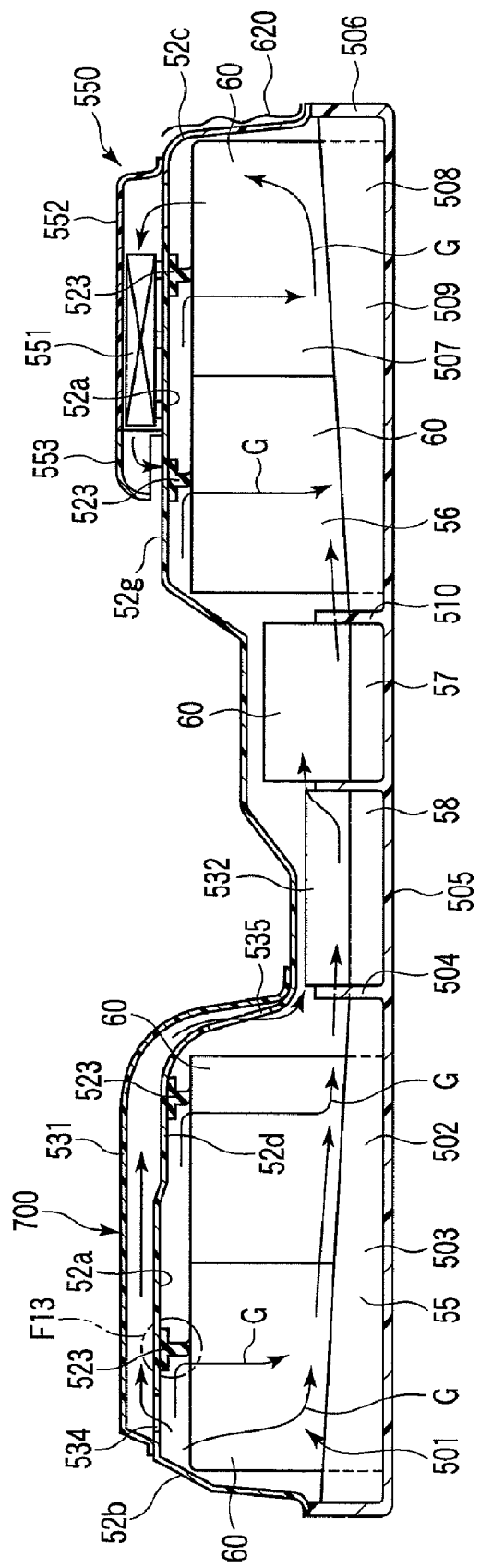
FIG. 11 is a sectional view through the battery unit shown in FIG. 1 in the front-back direction.

FIG. 11 is a sectional view through the battery unit 14 in the front-back direction, and shows the flow of the cooling air let in from the cooling air inlet 86.

As shown in FIG. 1, the cooling air inlet 86 is formed in the part of the cover member 52 located under the seat next to the driver 71*a*. The cooling air inlet 86 is connected by a cooling air duct 522 to the heat exchanger unit 15 disposed in the front part of the vehicle body 11. That is, the cooling air inlet 86 is disposed at the front left end of the cover member 52.

Incidentally, there are two ways of charging the battery unit 14; for example, one of which is a quick charge for charging in a short time, and the other uses, for example, a domestic power source to take a longer time for charging than the quick charge. In the case of the quick charge, the battery module 60 generates heat. Thus, the battery unit 14 is cooled off when quick-charged. During the quick charge, the cooling air is blown from the heat exchanger unit 15 through the cooling air duct 522. The cooling air duct 522 is positioned at the foot of the seat next to the driver 71*a*.

As shown in FIG. 11, the ribs 523 are fixed to a lower surface 52*a* of the cover member 52. Specifically, on the lower surface 52*a* of the cover member 52, two ribs 523 are fixed separately in the front-back direction in a range facing the front battery storage 55, and two ribs 523 are fixed separately in the front-back direction in a range facing the rear battery storage 56.

Figure 12:
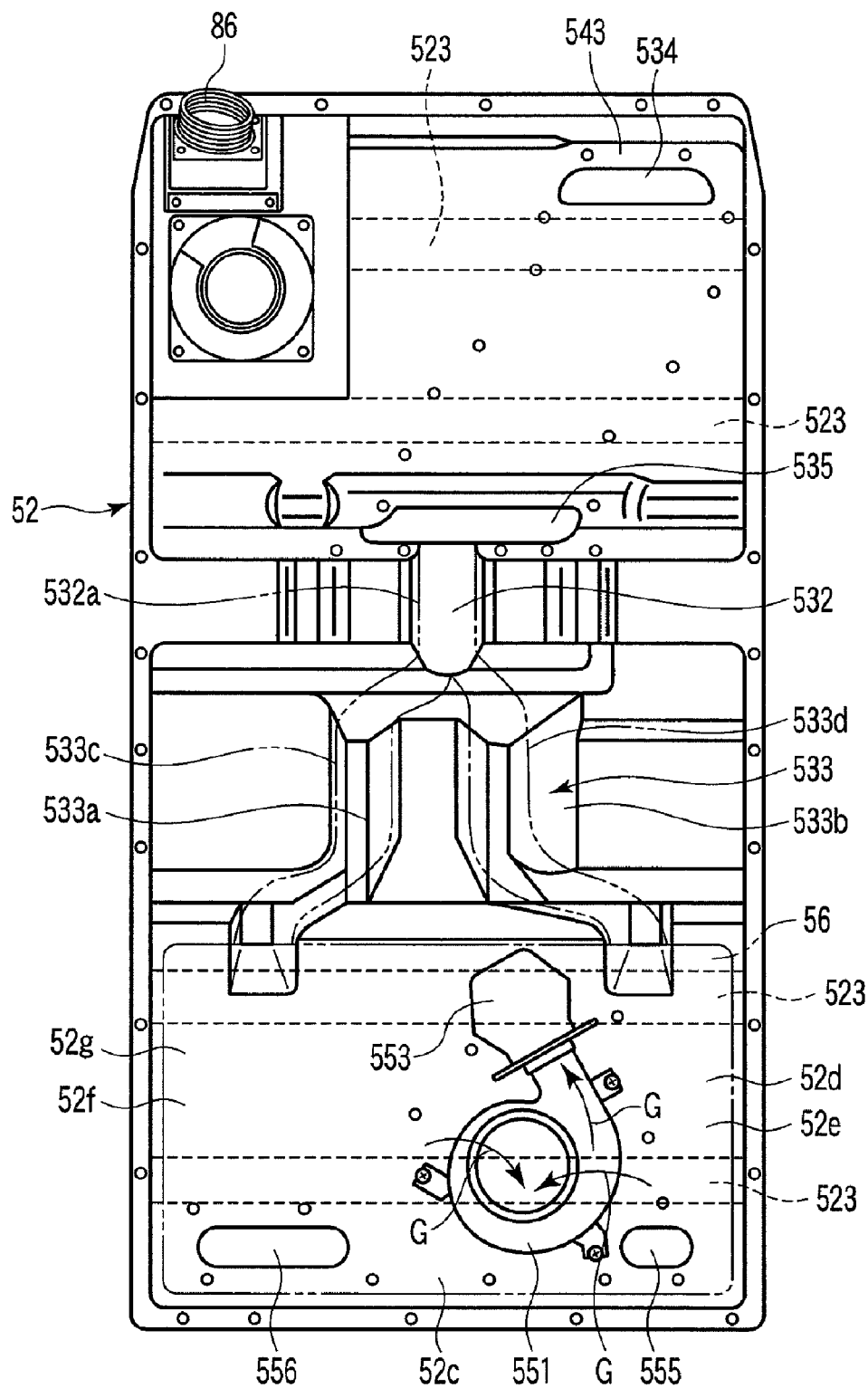
FIG. 12 is a plan view showing a cover member shown in FIG. 5 from which a fan cover and a bypass duct are removed.

FIG. 12 is a plan view showing the cover member 52. In FIG. 12, the bypass duct cover 531, the fan unit 550 and the battery protector 620 that will be described later are removed in FIG. 12. The ribs 523 are indicated by dashed lines in FIG. 12. The forefront rib 523 extends in the width direction from a position which does not overlap the cooling air inlet 86 in the front-back direction so that the flow of the cooling air from the cooling air inlet 86 may not be prevented. The other three ribs 523 extend from one end of the cover member 52 to the other in the width direction.

Figure 13:
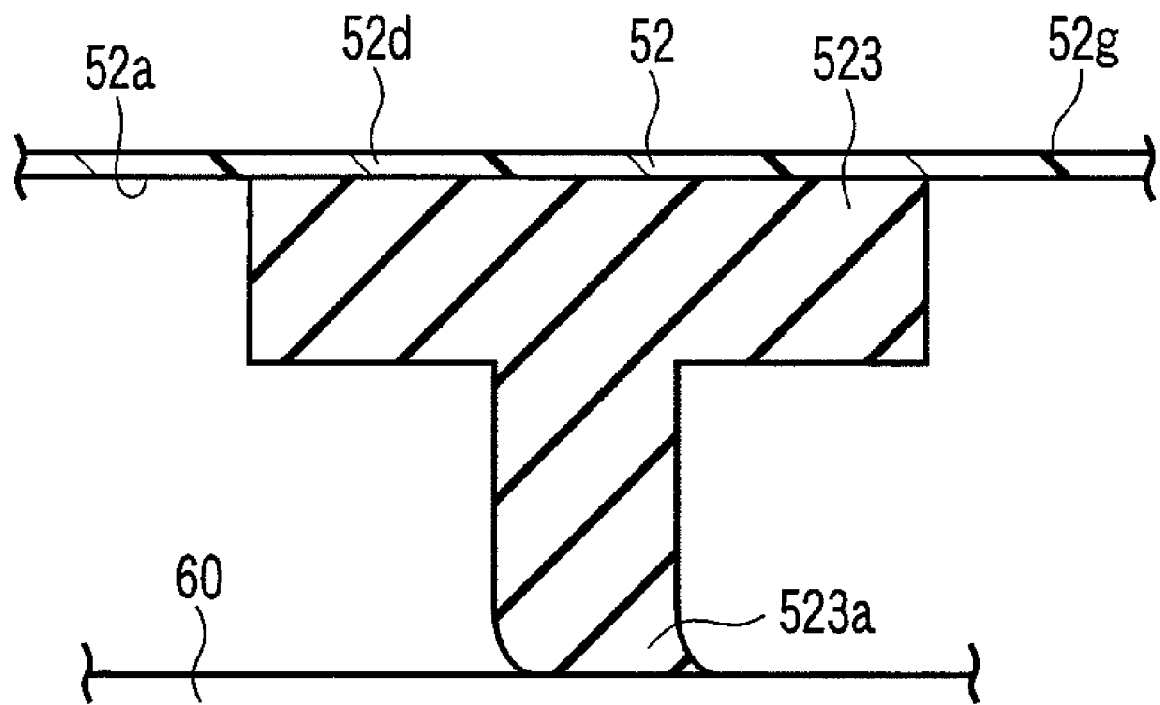
FIG. 13 is a sectional view showing in an enlarged manner a range of F13 shown in FIG. 11.

As shown in FIG. 11, the ribs 523 project downward from the lower surface 52*a* of the cover member 52 and are in contact with the upper surfaces of the battery modules 60. FIG. 13 is a sectional view showing in an enlarged manner a range of F13 shown in FIG. 11. FIG. 13 shows a part where the rib 523 is in contact with the battery module 60.

As shown in FIG. 13, the rib 523 is T-shaped in section and formed of a deformable elastic body. By way of example, rubber is used as the material of the rib 523. The rib 523 is sized so that its tip 523*a* slightly deforms as shown to ensure contact with the upper surface of the battery module 60 when the cover member 52 is fixed to the tray member 51. This ensures that the rib 523 comes into contact with the upper surface of the battery module 60. As indicated by arrows in FIG. 11, the ribs 523 function to guide the cooling air flowing in the upper part of the battery case 50 to the lower part.

In addition, the number of the ribs 523 is not limited to four. Moreover, the section of the rib 523 is not exclusively T-shaped and may be, for example, rectangular. The ribs 523 are members separate from the cover member 52. Therefore, the shape of the ribs 523 is easily adjusted to the size of the battery modules 60. Although the ribs 523 are fixed to the cover member 52, the ribs 523 may be fixed to the upper surfaces of the battery modules 60 (the upper surfaces of the housings 514) and come into contact with the cover member 52.

Figure 14:
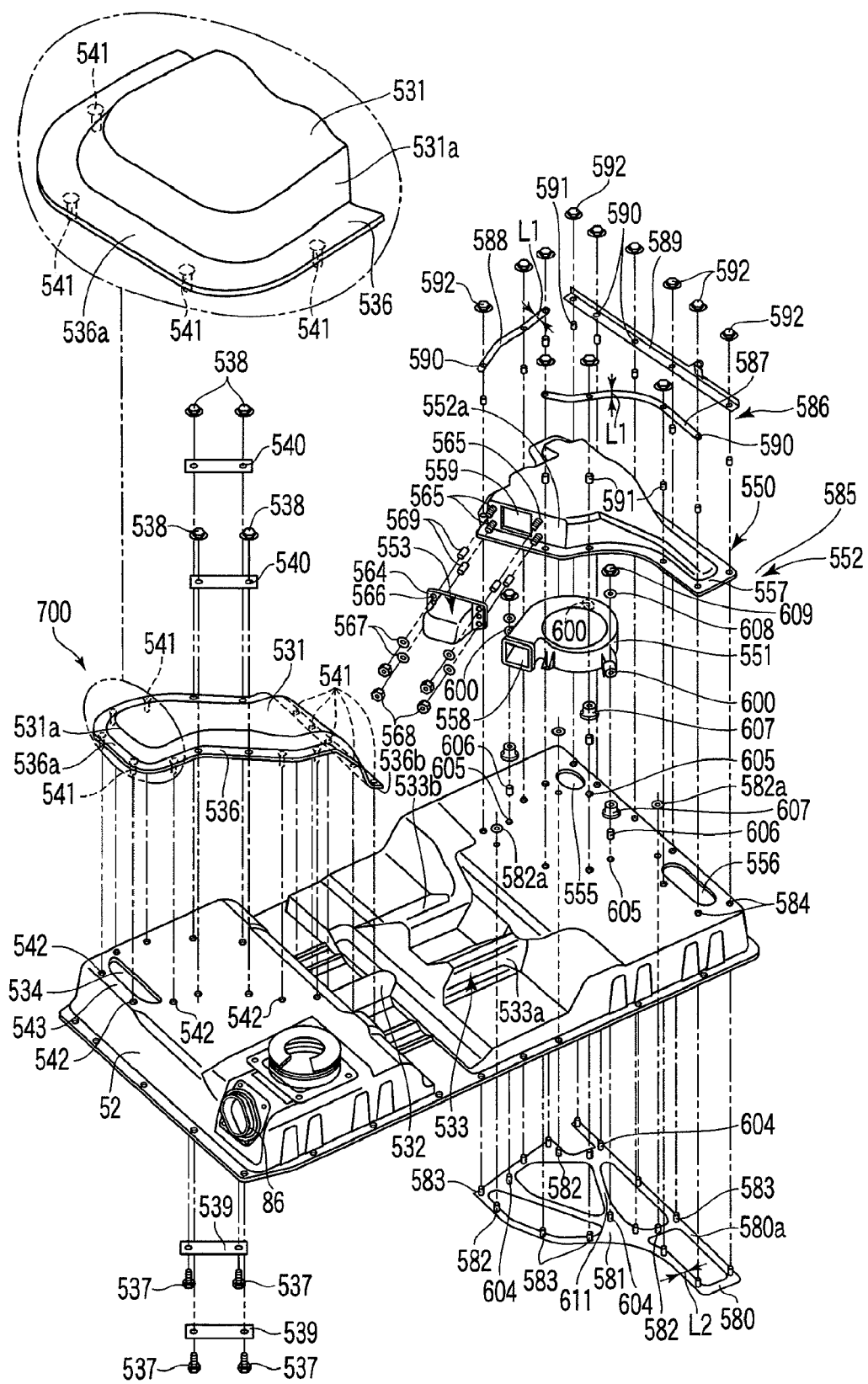
FIG. 14 is a perspective view showing the bypass duct and a fan unit removed from the cover member shown in FIG. 5.

The bypass duct cover 531 functions to guide the cooling air flowing in from the cooling air inlet 86 to the downstream of the front battery storage 55 in such a manner as to bypass the front battery storage 55. As shown in FIGS. 2, 4 and 5, the bypass duct cover 531 is attached to the upper surface of the cover member 52. FIG. 14 shows the bypass duct cover 531 removed from the cover member 52. As shown in FIG. 14, a bypass exit opening 534 is formed in the upper wall of the cover member 52 opposite to the cooling air inlet 86, that is, on the side of the driver's seat 71*b*.

The bypass exit opening 534 pierces the cover member 52. Moreover, as shown in FIG. 12, a bypass entrance opening 535 is formed in the part of the upper wall of the cover member 52 located behind the front battery storage 55. The bypass entrance opening 535 is located in the center of the width direction of the cover member 52.

The bypass duct cover 531 is fixed to the upper surface of the cover member 52 to cover the bypass exit opening 534 and the bypass entrance opening 535. As shown in FIGS. 10 and 11, the section of the bypass duct cover 531 is concave so that an opening is formed on the side of the cover member 52. A flow path is defined between the bypass duct cover 531 and the upper surface of the cover member 52 so that the cooling air which has exited from the bypass exit opening 534 can flow to the bypass entrance opening 535.

In addition, as shown in FIG. 12, the forefront rib 523 is located right behind the bypass exit opening 534. Thus, part of the cooling air let in from the cooling air inlet 86 is guided to the bypass exit opening 534 by the forefront rib 523.

As shown in FIG. 14, a circumferentially extending flange 536 is formed on the peripheral edge of the bypass duct cover 531. The flange 536 comes into contact with the upper surface of the cover member 52. The part of the flange 536 located substantially in the center of the front-back direction is fastened to the cover member 52 by a total of four bolts 537 and a total of four nuts 538; two bolts and two nuts on each of right and left sides. In this case, the bolts 537 are inserted from the side of the cover member 52.

Metal plates 539 are interposed between the cover member 52 and the bolts 537. Similarly, metal plates 540 are interposed between the flange 536 of the bypass duct cover 531 and the nuts 538. Thus, the resin cover member 52 and the flange 536 are fastened to each other by the bolts 537 and the nuts 538 with the pairs of metal plates 539, 540 interposed in between, so that the cover member 52 and the flange 536 are inhibited from being deformed due to the fastening force by the bolts 537 and the nuts 538.

The flange 536 is fixed to the cover member 52 by welding using bosses 541 except for the parts fastened by the bolts 537 and the nuts 538. This is specifically described. The front end of the bypass duct cover 531 is shown in an enlarged manner within a zone indicated by a two-dot chain line in FIG. 14.

As shown in FIG. 14, the downwardly projecting bosses 541 are formed in the flange 536 except for the middle parts in the front-back direction (except for the parts fastened by the bolts 537 and the nuts 538). The bosses 541 are thinner than the bolts 537. Insertion holes 542 for the insertion of the bosses 541 are formed in the parts of the cover member 52 facing the bosses 541 of the flange 536. The bosses 541 are formed in the whole region of the flange 536 (the whole region except for the parts fastened by the bolts 537 and the nuts 538).

FIG. 10 shows how the front end of the flange 536 of the bypass duct cover 531 is linked to the front end of the cover member 52 by welding using the bosses 541. As shown in FIG. 10, the bosses 541 inserted through the insertion holes 542 are melted to weld the flange 536 and the cover member 52 together. Other parts of the flange 536 are linked to the cover member 52 in a manner similar to the linkage shown in FIG. 10.

The front end of the flange 536 is fixed to the cover member 52 by welding using the bosses 541, so that the width of the front end of the flange 536 has only to have a size necessary to form the bosses 541. As described above, the bosses 541 are thinner than the bolts 537. Therefore, the width of the front end of the flange 536 in the front-back direction can be reduced.

As a result, the longitudinal width of an edge 543 from the front end of the cover member 52 to the bypass exit opening 534 can be reduced. Therefore, when the cooling air flows into the bypass duct cover 531 through the bypass exit opening 534, pressure loss due to the blowing of the cooling air against the edge 543 is inhibited, and the flow path is inhibited from being formed into a step shape by the edge 543.

In addition, the rear end of the flange 536 is also fixed to the cover member 52 by welding using the bosses 541, so that similar effects can also be obtained when the cooling air flows into the battery case 50 from the bypass duct cover 531 through the bypass entrance opening 535.

Thus, the bypass exit opening 534 is disposed ahead of the front battery storage 55, and the bypass entrance opening 535 is disposed behind the front battery storage 55, so that part of the cooling air let in from the cooling air inlet 86 bypasses the front battery storage 55 and flows to the downstream of the front battery storage 55.

As shown in FIG. 14, a tunnel 532 is formed behind the bypass entrance opening 535 in the cover member 52. The tunnel 532 is disposed between the electric circuit storages 58 in the cover member 52. The tunnel 532 has an upwardly bulging sectional shape.

As described above, the cover member 52 is recessed in the vicinity of the electric circuit storages 58 as compared with the parts of the front battery storage 55 and the rear battery storage 56. Therefore, there is no space for the cooling air to flow in the vicinity of the electric circuit storages 58. The cooling air flows through the tunnel 532 without flowing in the vicinity of the electric circuit storages 58. The intention in doing this is to inhibit water contained in the cooling air from being blown against the electric components in the electric circuit storages 58 due to the blowing of the cooling air against the electric circuit storages 58.

As shown in FIG. 4, a cross member 34 of the frame body structure 30 is disposed above the tunnel 532. Thus, as shown in FIG. 2, a concave portion 34a for receiving the tunnel 532 is formed in the part of the cross member 34 facing the tunnel 532 in order to avoid any interference with the tunnel 532. In addition, a cross member in which a concave portion is formed to pass, for example, a propeller shaft may be used as the cross member 34.

The tunnel 532 extends to the vicinity of the central battery storages 57. A two-way flow path 533 divided into right and left sides is formed behind the tunnel 532 in the cover member 52. The left flow path of the two-way flow path 533 is a first flow path 533a. The right flow path is a second flow path 533b. The first and second flow paths 533a, 533b are in communication with the tunnel 532.

Parts of the first and second flow paths 533a, 533b are located above the left and right central battery storages 57. Thus, the cooling air which has passed through the tunnel 532 cools off the battery modules 60 stored in the central battery storages 57 when passing through the first and second flow paths 533a, 533b. The first and second flow paths 533a, 533b are in communication with the rear battery storage 56 in the battery case 50.

The fan unit 550 is disposed on the upper surface of the part of the cover member 52 corresponding to the rear battery storage 56. FIG. 14 is a perspective view showing the fan unit 550 in an exploded state. As shown in FIG. 14, the fan unit 550 includes an exhaust fan 551, a fan cover 552 and an exhaust duct unit 553.

FIG. 12 is a plan view showing the exhaust fan 551 attached to the cover member 52. The exhaust duct unit 553 is attached to the exhaust fan 551 in FIG. 12. As shown in FIG. 12, the exhaust fan 551 is disposed closer to one end of the cover member 52 than the center of the cover member 52 in the width direction (lateral direction), in this embodiment, disposed closer to right end of the cover member 52. That is, the exhaust fan 551 is disposed at the end opposite to the cooling air inlet 86 in the width direction of the vehicle body 11.

Although not shown, a cable for a parking brake and a pipe for a cooling liquid of the motor 12 (a pipe laid between the motor 12 and a radiator located in the front part of the vehicle) pass through the center of the vehicle body 11 in the vehicle width direction. Moreover, the exhaust duct unit 553 described later is attached to the exhaust fan 551.

Thus, in order to avoid any interference with the cable for the parking brake and the cooling liquid pipe and to allow for the exchange of the exhaust duct unit 553, the exhaust fan 551 is disposed closer to one side in the vehicle width direction as described above. As the exhaust fan 551 is closer to one side in the vehicle width direction, the hand of an operator easily reaches a filter 561 of the exhaust duct unit 553 when the filter 561 is exchanged. Therefore, there is no need to remove the battery unit 14, so that the efficiency of the exchange operation improves.

The exhaust fan 551 is, for example, a sirocco fan. As indicated by arrows in FIG. 12, the exhaust fan 551 sucks the cooling air from the center. As shown in FIG. 14, a fan exhaust opening 558 of the exhaust fan 551 is oriented forward, and therefore discharges the cooling air forward. The exhaust duct unit 553 is attached to the fan exhaust opening 558.

As shown in FIG. 12, the first outlet 555 and the second outlet 556 are formed in the cover member 52. The first outlet 555 is disposed at the right end of the rear end of the cover member 52. The second outlet 556 is disposed at the left end of the rear end of the cover member 52. The first and second outlets 555, 556 pierce the cover member 52 so that the cooling air in the battery case 50 is discharged to the outside through the first and second outlets 555, 556.

As shown in FIG. 14, the fan cover 552 is attached to the cover member 52 to cover the exhaust fan 551 and the first and second outlets 555, 556 from above. The fan cover 552 is in the shape of a box having an opening on the lower side (on the side of the cover member 52), and stores the exhaust fan 551 therein. The fan cover 552 also functions as a flow path for guiding the cooling air discharged from the first and second outlets 555, 556 to the exhaust fan 551.

A circumferentially outwardly extending flange 557 is formed on the peripheral edge of the fan cover 552. The flange 557 is liquid-tightly and airtightly fixed to the upper surface of the cover member 52. Moreover, a fan cover outlet 559 is formed in the part of the fan cover 552 facing the fan exhaust opening 558 of the exhaust fan 551. The fan exhaust opening 558 and the fan cover outlet 559 are open forward.

A fixing structure of the fan cover 552 and the cover member 52 and a fixing structure of the exhaust fan 551 and the cover member 52 will be described later in detail.

The fan cover 552 is liquid-tightly and airtightly attached to the upper surface of the cover member 52, so that the exhaust fan 551 sucks out the cooling air G in the battery case 50 through the first and second outlets 555, 556. In this case, the first outlet 555 is disposed in the vicinity of the exhaust fan 551, and the second outlet 556 is disposed on the opposite side of the exhaust fan 551 in the width direction.

Thus, the first outlet 555 is formed to be smaller than the second outlet 556. The second outlet 556 is formed to be long in the width direction. The reason for this is that the suction force acting on the first outlet 555 is greater than the suction force acting on the second outlet 556 due to the difference in distance from the first and second outlets 555, 556 to the exhaust fan 551.

The first outlet 555 is smaller because the suction force acting on the first outlet 555 is greater. The second outlet 556 is larger because the suction force acting on the second outlet 556 is smaller. The sizes of the first and second outlets 555, 556 are set so that the amounts of the cooling air sucked out may be substantially equal.

As a result, the amounts of the cooling air toward the first and second outlets 555, 556 (the amounts of the cooling air toward both rear ends of the rear battery storage 56) are equal in the rear battery storage 56, so that the battery modules 60 in the rear battery storage 56 are equally cooled off.

Furthermore, the cooling air inlet 86 is disposed opposite to the first outlet 555 in the width direction, so that the efficiency of cooling off the battery modules 60 in the rear battery storage 56 improves. This takes advantage of the fact that the first outlet 555 is smaller and the flow of the cooling air toward the first outlet 555 is therefore faster than the flow of the cooling air toward the second outlet 556. The diagonal flow of the cooling air in the battery case 50 is thus fast so that the cooling air efficiently flows through the entire battery case 50. In addition, the cooling air inlet 86 is not exclusively disposed at the end (in the present embodiment, front left end) opposite to the first outlet 555. The effects described above can be obtained as long as the cooling air inlet 86 is disposed in a range opposite to the end at which the first outlet 555 is disposed across the center of the width direction of the battery case 50 (a range from the above-mentioned center to the end opposite to the end at which the first outlet 555 is disposed).

Figure 15:
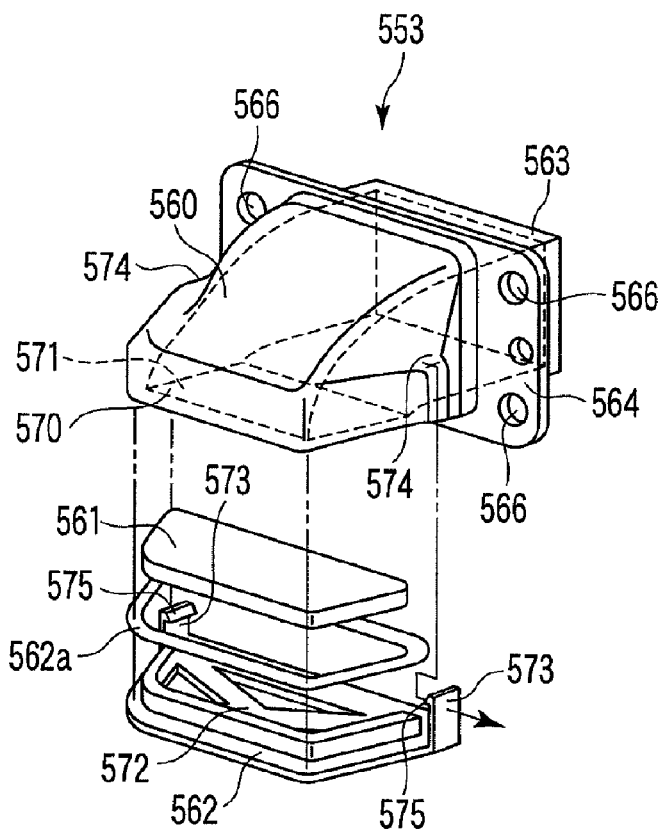
FIG. 15 is a perspective view showing in an exploded manner an exhaust duct unit shown in FIG. 14.

FIG. 15 is a perspective view showing the exhaust duct unit 553 in an exploded manner. As shown in FIG. 15, the exhaust duct unit 553 includes an exhaust duct 560, the filter 561, a filter fixing member 562 and a seal member 562a.

Figure 16:
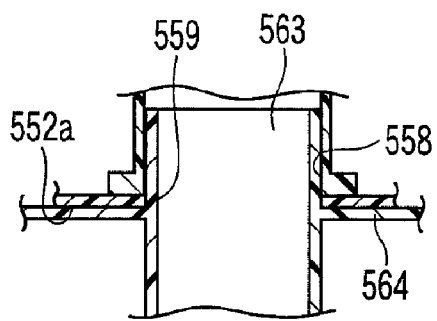
FIG. 16 is a sectional view showing the duct shown in FIG. 15 in the insertion direction of an insertion portion.

The side surface of the exhaust duct 560 is substantially L-shaped. One end 563 of the exhaust duct 560 is, for example, cylindrical, and is fitted into the fan exhaust opening 558 of the exhaust fan 551 through the fan cover outlet 559. FIG. 16 is a sectional view showing the one end 563 fitted in the fan exhaust opening 558 in the insertion direction of the one end 563. As shown in FIG. 16, the one end 563 is fitted in the fan exhaust opening 558 in a direction traversing the vertical direction. The tip of the one end 563 is open, so that the cooling air discharged from the exhaust fan 551 is guided into the exhaust duct unit 553.

A circumferentially extending flange 564 is formed at the one end 563 of the exhaust duct 560. When the one end 563 is fitted in the fan exhaust opening 558 through the fan cover outlet 559, the flange 564 is in contact with the periphery of the fan cover outlet 559 on the outer surface of the fan cover 552.

The outer surface of the periphery of the fan cover outlet 559 of the fan cover 552 has a shape following the flange 564, so that the flange 564 may come into stable surface contact. For example, the outer surface of the periphery of the fan cover outlet 559 is formed flat.

As shown in FIG. 14, outwardly projecting bolts 565 are provided in the parts of the fan cover 552 overlapping the flange 564. The bolts 565 are parallel with the direction (direction traversing the vertical direction) of the insertion of the one end 563 into the fan exhaust opening 558. Bolt insertion holes 566 for the insertion of the bolts 565 are formed in the parts of the flange 564 facing the bolts 565. The bolts 565 which have passed through the bolt insertion holes 566 pass through washers 567 and are screwed to nuts 568, such that the exhaust duct 560 is fixed to the fan cover 552. Collars 569 into which the bolts 565 are inserted are inserted into the bolt insertion holes 566.

Although not shown, the flange 564 and the fan cover 552 are liquid-tightly sealed, thereby preventing a liquid such as water from entering the fan cover 552 from the junction between the exhaust duct 560 and the fan cover 552. Moreover, the direction in which the exhaust duct 560 and the fan cover 552 are linked together (direction in which the one end 563 is inserted) traverses the vertical direction, so that a liquid such as water does not easily enter from the junction between the exhaust duct 560 and the fan cover 552.

As described above, the exhaust duct 560 is substantially L-shaped, and the other end 570 is therefore open downward. In addition, the exhaust duct 560 is disposed on the upper surface of the cover member 52 so that the exhaust duct 560 has a predetermined height from the ground. Thus, even when the electric vehicle 10 runs through a puddle, a duct opening 571 at the other end 570 of the exhaust duct 560 is not easily splashed with water.

Furthermore, the duct opening 571 of the exhaust duct 560 is oriented forward. Thus, even when the rear wheel 21 raises water, the raised water does not easily reach the duct opening 571. Moreover, the flow path in the exhaust duct 560 is L-shaped, so that water does not easily enter the fan cover 552. Thus, the entry of water into the fan cover 552 through the duct opening 571 is inhibited.

As shown in FIG. 15, the filter 561 covers the whole duct opening 571 of the exhaust duct 560 from beneath. The filter fixing member 562 is removably attached to the other end 570 from beneath across the filter 561. The filter fixing member 562 has a lower wall 572 overlapping the lower surface of the filter 561. A plurality of through-holes are formed in the lower wall 572, and the flow of the cooling air discharged from the duct opening 571 is therefore not blocked.

As described above, since the battery modules 60 are, by way of example, cooled off when charged, the outside (outer surface) of the filter 561 gathers, for example, dust during normal driving of the electric vehicle 10. Then, during the cooling of the battery modules 60, the cooling air is discharged from the inside (surface facing the inside of the exhaust duct 560) of the filter 561 to the outside. At the same time, the dust and the like gathered on the outside of the filter 561 are removed by the cooling air, so that the filter 561 is inhibited from being clogged by the dust and the like.

Furthermore, as described above, the duct opening 571 is not easily splashed with water owing to the arrangement and shape of the exhaust duct 560. Therefore, the filter 561 has only to function to prevent the entry of dust and the like without considering the entry of a liquid such as water. Thus, the cooling air discharged to the outside more easily passes through the filter 561, resulting in reduced pressure loss of flow during passage through the filter 561. This improves the circulation of the cooling air inside the battery case 50, so that the battery modules 60 are efficiently cooled off.

A pair of claw portions 573 are formed in the filter fixing member 562 as one example of a fixing portion for removably fixing the filter fixing member 562 to the exhaust duct 560. The claw portions 573 are arranged opposite to each other. Engagement portions 574 with which the claw portions 573 are engaged are formed in the outer peripheral surface of the other end 570 of the exhaust duct 560.

Inwardly projecting claws 575 are formed in the claw portions 573. The engagement portions 574 are step-shaped so that the claws 575 of the claw portions 573 may be engaged therewith. The claws 575 are engaged with the engagement portions 574 such that the lower wall 572 of the filter fixing member 562 is liquid-tightly fixed to the peripheral edge of the duct opening 571 with the seal member 562a interposed in between. Thus, the duct opening 571 is covered with the filter 561.

In addition, as indicated by an arrow in FIG. 15, the claw portions 573 deform to open outward when urged outward. The claws 575 and the engagement portions 574 are disengaged if the claw portions 573 deform to open outward, so that the filter 561 can be attached/detached.

Next, the fixing structure of the fan cover 552 and the cover member 52 is specifically described. As shown in FIG. 14, the flange 557 of the fan cover 552 is in contact with the upper surface of the cover member 52. A metal fan cover plate lower 580 is disposed on the lower surface of the cover member 52. The fan cover plate lower 580 is frame-shaped, and has a peripheral edge 581 facing the flange 557 of the fan cover 552 through the cover member 52.

Figure 17:
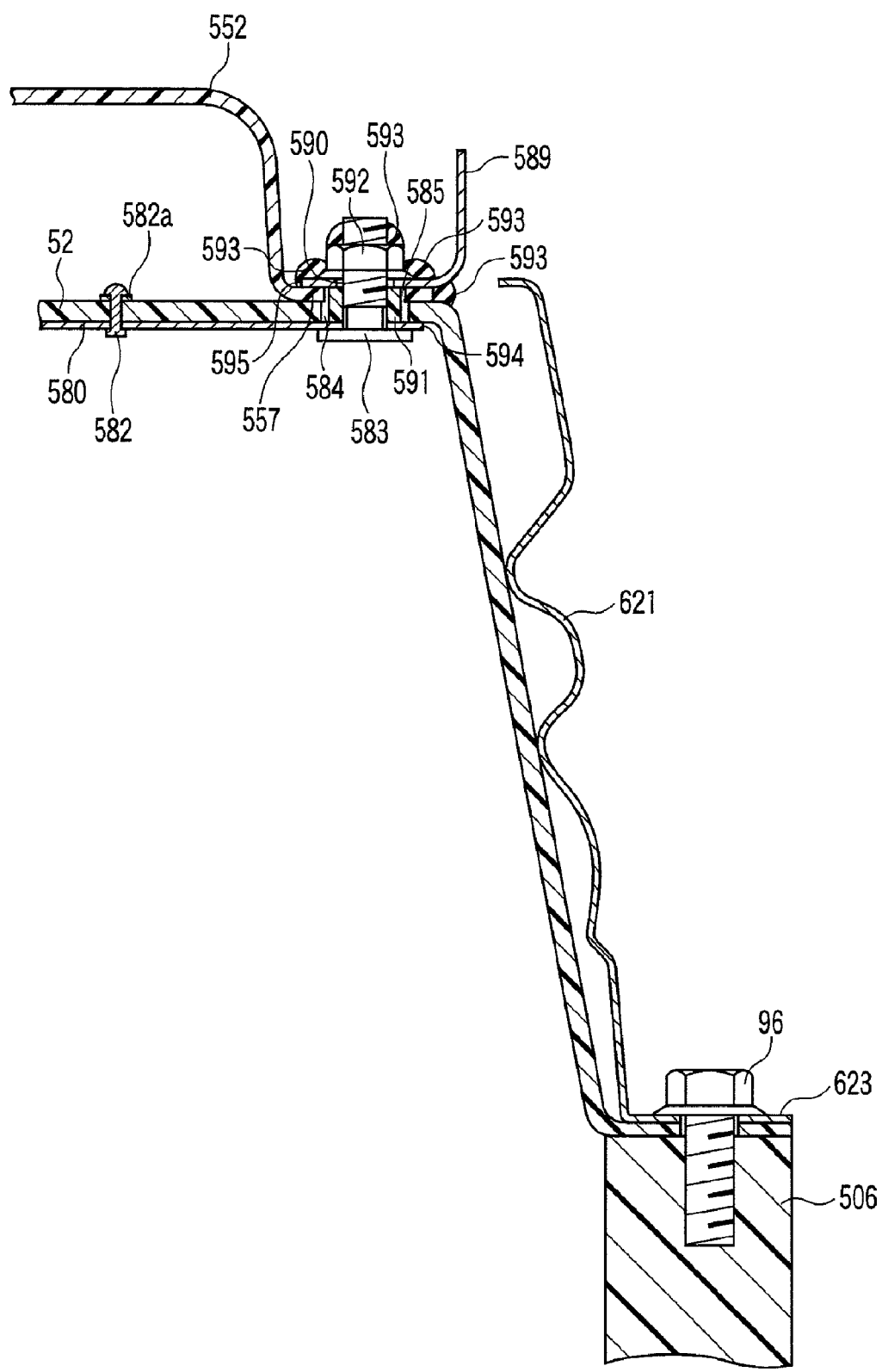
FIG. 17 is a sectional view showing the rear end of the battery unit shown in FIG. 1 in the front-back direction.

The fan cover plate lower 580 is fixed to the cover member 52 by rivets 582, and a plurality of upwardly projecting weld bolts 583 are welded and fixed to the fan cover plate lower 580. FIG. 17 is a sectional view through the weld bolt 583 provided at the rear end of the fan cover plate lower 580. Incidentally, the battery module 60 is not shown. As shown in FIGS. 14 and 17, bolt insertion holes 584, 585 for the insertion of the weld bolt 583 are formed in the part of the flange 557 of the fan cover 552 and the part of the cover member 52 that face the weld bolt 583.

Furthermore, a metal fan cover plate upper 586 is provided in the range of the upper surface of the flange 557 of the fan cover 552 where the bolt insertion hole 585 is formed. The fan cover plate upper 586 is shaped to be divided into parts, and includes, in the present embodiment, first to third fan cover plate uppers 587, 588, 589.

The first fan cover plate upper 587 is disposed at the left end. The second fan cover plate upper 588 is disposed at the right end. The third fan cover plate upper 589 is disposed at the rear end. The first to third fan cover plate uppers 587 to 589 are formed in accordance with the shapes of the parts of the flange 557 in which these fan cover plate uppers are arranged. Bolt insertion holes 590 for the insertion of the weld bolts 583 are formed in the first to third fan cover plate uppers 587 to 589.

As shown in FIGS. 14 and 17, collars 591 are received in the bolt insertion holes 584, 585 formed in the flange 557 of the fan cover 552 and the cover member 52. The weld bolt 583 is inserted through the bolt insertion holes 584, 585, 590 and through the collar 591, and then screwed to a nut 592.

Seal members 593 are provided between the nuts 592 and the first to third fan cover plate uppers 587 to 589, between screw holes of the nuts 592 and the weld bolts 583 and between the fan cover 552 and the cover member 52. Clearances in between are liquid-tightly sealed. Thus, there is no entry of a liquid such as water into the fan cover 552 from the outside.

The rivets 582 are located further inside the cover member 52 than the above-mentioned seal member 593. The entry of a liquid from the outside is prevented by the seal member 593 in the space inside the seal member 593 in the cover member 52. Therefore, after the rivet 582 is fixed to the cover member 52 with a washer 582a interposed in between, there is no need to provide a seal member around the insertion hole of the cover member 52 through which the rivet 582 is inserted. In addition, the rivets 582 are welded to the fan cover plate lower 580, so that the fan cover plate lower 580 is inhibited from dropping into the battery case 50 while being fastened to the nut 592.

Figure 18:
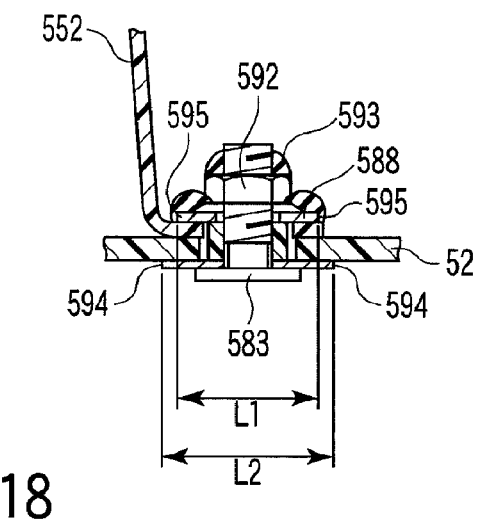
FIG. 18 is a sectional view showing a fixing structure of the cover member and the fan cover shown in FIG. 17, in a part different from the part shown in FIG. 17.

FIG. 18 shows the fixing structure of the cover member 52 and the fan cover 552 in a part different from the part shown in FIG. 17. As shown in FIGS. 17 and 18, a peripheral edge 594 of the fan cover plate lower 580 and a peripheral edge 595 of the fan cover plate upper 586 do not overlap each other in the vertical direction (fastening direction of the bolt 583 and the nut 592).

The fan cover 552 is fastened to the cover member 52 by the weld bolt 583 and the nut 592. On the other hand, the fan cover 552 and the cover member 52 are interposed between the fan cover plate upper 586 and the fan cover plate lower 580, thereby increasing the likelihood of maintaining the liquid-tight state upon the occurrence of damage to the resin fan cover 552 and cover member 52 caused by the force of fastening the weld bolt 583 and the nut 592.

The force of fastening the weld bolt 583 and the nut 592 is received by the cover member 52 and the fan cover 552 from the peripheral edge 595 of the fan cover plate upper 586 and the peripheral edge 594 of the fan cover plate lower 580. However, the peripheral edges 594, 595 of the fan cover plate lower 580 and the fan cover plate upper 586 do not overlap each other in the vertical direction (fastening direction of the bolt 5835 and the nut 592), so that the load input by the fastening force is not concentrated at points in the cover member 52 and the fan cover 552.

In addition, as shown in FIG. 18, the width L1 of the fan cover plate upper 586 (the first to third fan cover plate uppers 587 to 589) may be smaller than the width L2 of the fan cover plate lower 580. Alternatively, the width L2 may be smaller than the width L1. Thus, the peripheral edges 594, 595 do not overlap each other in the vertical direction (fastening direction of the bolt 583 and the nut 592). In addition, the relation of the arrangement of the peripheral edges 594, 595 and the relation between the width L1 and the width L2 are similar in parts other than the parts shown in FIGS. 17 and 18.

Figure 19:
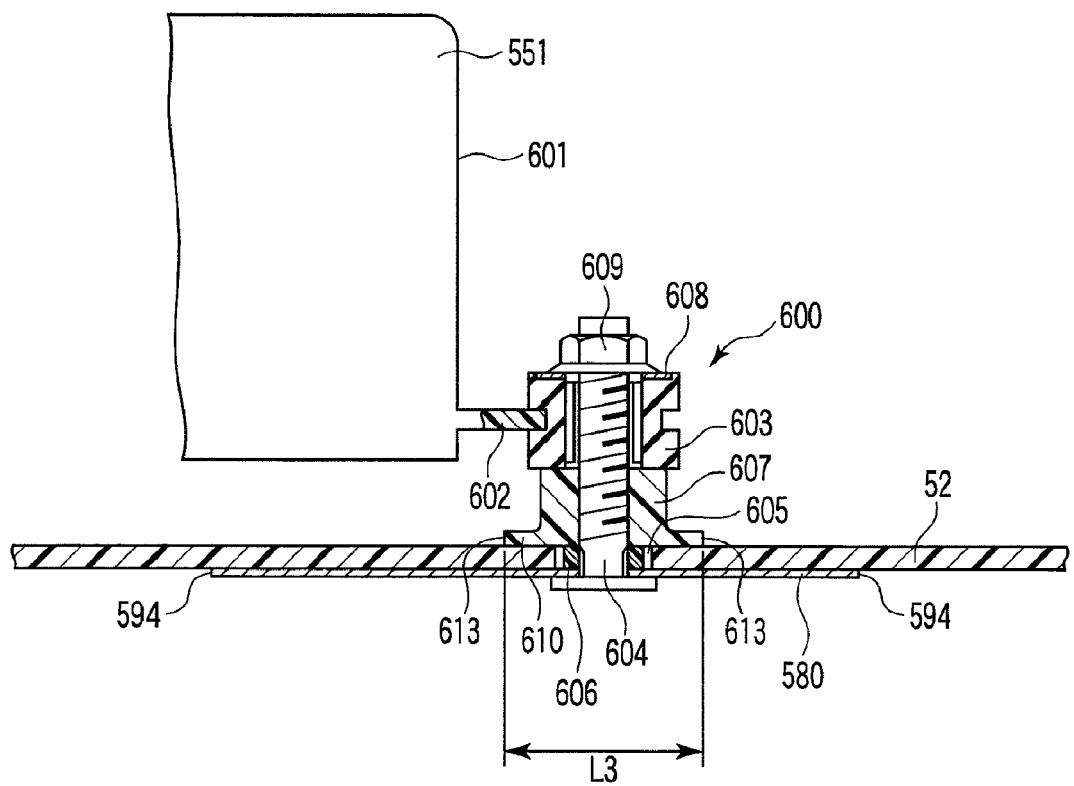
FIG. 19 is a sectional view showing the vicinity of an exhaust fan fixing portion shown in FIG. 14.

Next, the fixing structure of the cover member 52 and the exhaust fan 551 is specifically described. As shown in FIG. 14, exhaust fan fixing portions 600 are formed at three places in the peripheral edge of the lower end of the exhaust fan 551. FIG. 19 is a sectional view of the vicinity of the exhaust fan 551. FIG. 19 shows the vicinity of the exhaust fan fixing portion 600. In addition, the structures of the exhaust fans at the other two places may be similar.

As shown in FIG. 19, the exhaust fan fixing portion 600 includes an arm 602 circumferentially extending from a housing 601 of the exhaust fan 551, and a cylindrical absorber 603 provided at the end of the arm 602.

As shown in FIG. 14, upwardly projecting weld bolts 604 are provided in the parts of the fan cover plate lower 580 located under the exhaust fan 551 (absorber 603). The weld bolts 604 are fixed to the fan cover plate lower 580 by welding. In addition, the fan cover plate lower 580 is in the shape of a frame having the peripheral edge 581 as described above, and a plurality of beams 611 are also formed in the peripheral edge 581 so that a plate part is also located under the absorber 603.

Bolt insertion holes 605 through which the weld bolts 604 can be inserted are formed in the part of the cover member 52 facing the weld bolt 604. As shown in FIG. 19, the absorber 603 is an elastic body, and allows the weld bolt 604 to be inserted therethrough. A collar 606 is inserted in the bolt insertion hole 605 formed in the cover member 52. Further, a cylindrical spacer 607 which allows the weld bolt 604 to be inserted therethrough is interposed between the cover member 52 and the absorber 603. A washer 608 is provided on the upper surface of the absorber 603 in an interposed manner.

The weld bolt 604 passes through the bolt insertion hole 605 and through the collar 606, the spacer 607, the absorber 603 and the washer 608, and then screwed to a nut 609. The exhaust fan 551 is fixed to the cover member 52 by the weld bolts 604 and the nuts 609.

A space is defined between the exhaust fan 551 and the cover member 52 by the spacer 607. Moreover, the absorber 603 is provided to absorb the vibration of the exhaust fan 551. Owing to the above-mentioned space and the absorber 603, the vibration of the exhaust fan 551 is not easily transmitted to the cover member 52.

A circumferentially outwardly extending flange 610 having a circular planar shape is formed on the peripheral edge of the lower part of the spacer 607. The flange 610 is in contact with the upper surface of the cover member 52. The width L1 of the fan cover plate lower 580 is larger than the width (diameter) L3 of the flange 610. In other words, the flange 610 is received within the plate portion of the fan cover plate lower 580. Further, a peripheral edge 613 of the flange 610 of the spacer 607 does not overlap the peripheral edge 594 of the fan cover plate lower 580 in the vertical direction (fastening direction of the bolt 604 and the nut 609).

Thus, a load input from the peripheral edge 613 of the flange 610 of the spacer 607 acts on a part of the cover member 52 different from a part on which a load input from the peripheral edge 594 of the fan cover plate lower 580 acts. As a result, these loads are not concentrated, and the strain within the cover member 52 due to the fastening force by the bolts 604 and the nuts 609 is reduced. Moreover, the vibration of the exhaust fan 551 on the cover member 52 is inhibited from being concentrated.

Figure 20:
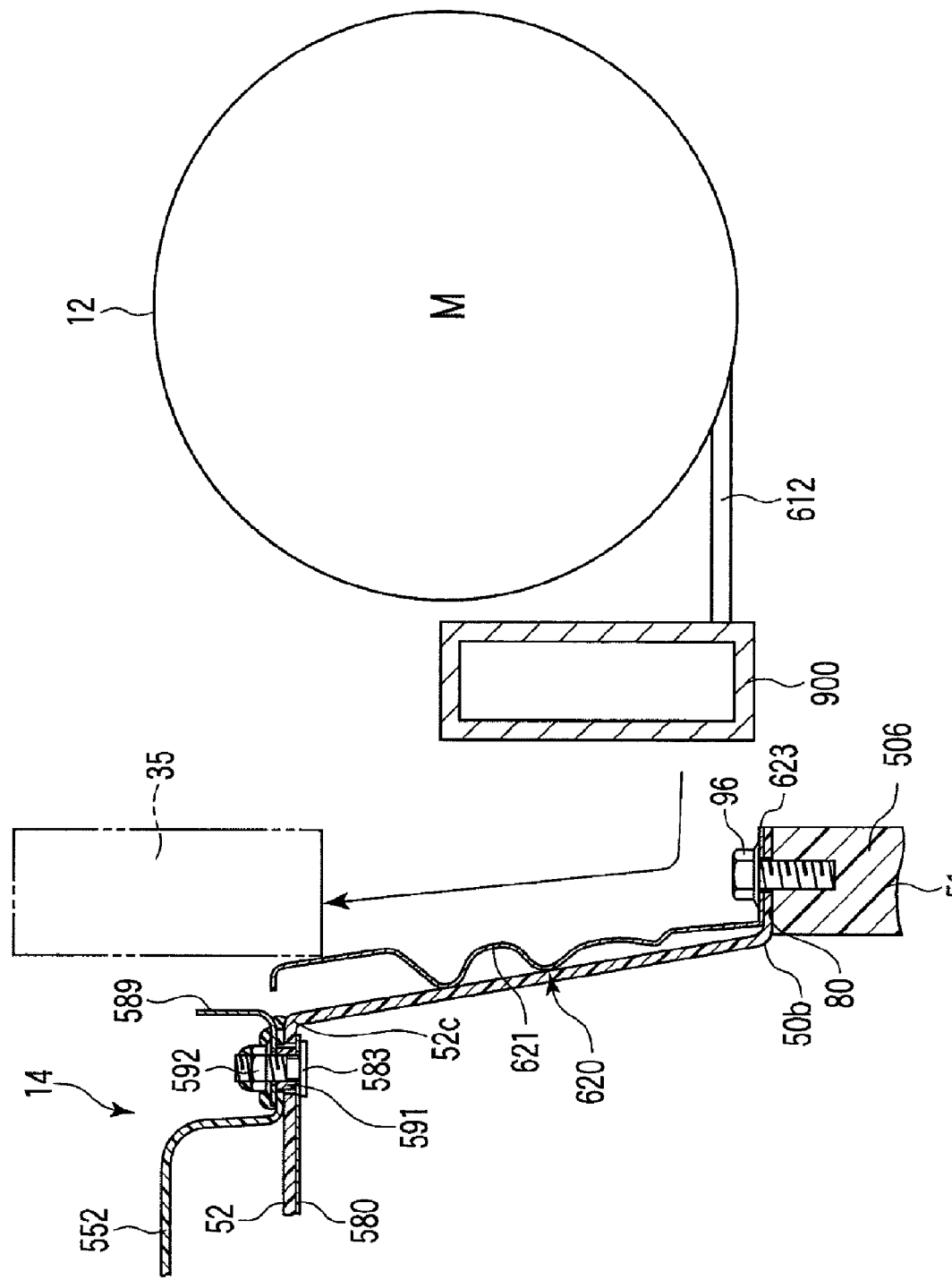
FIG. 20 is a sectional view showing the positional relation between a motor and the battery unit shown in FIG. 1.

FIG. 20 is a sectional side view schematically showing the position of the rear portion of the battery unit 14 and the position of the motor 12. As described above, the battery unit 14 is located ahead of the motor 12. The motor 12 is fixed to a cross member 900 via a bracket 612.

The cross member 900 is located behind the battery unit 14 attached to the vehicle body 11, and located ahead of the motor 12. The cross member 900 is formed, for example, across the side members 31, 32, and forms part of the frame body structure 30. In addition, the motor 12 is not exclusively fixed to the cross member 900 via the bracket 612. The fixing structure of the motor 12 is not limited.

The battery unit 14 includes, as a reinforcing structure, the battery protector 620 and the third fan cover plate upper 589. FIG. 5 shows the battery protector 620 removed from the battery case 50. As shown in FIG. 5, the battery protector 620 is fixed to the rear end of the battery case 50.

The battery protector 620 has a forwardly open concave shape. The battery protector 620 has a rear wall 621 disposed on the rear end of the flange 95 of the cover member 52, and a pair of side walls 622 disposed on the right and left ends of the flange 95. The rear wall 621 and the pair of side walls 622 are formed integrally with each other. A protector flange 623 overlapping the flange 95 is formed on the lower edges of the rear wall 621 and the pair of side walls 622.

The battery protector 620 is formed of a metal plate member. The protector flange 623 is fixed to the battery case 50 by the bolts 96 and the nuts 97 that fix the tray member 51 and the cover member 52 together. Specifically, the lower end of the battery protector 620 is fixed to the tray member 51 by the bolts 96 and the nuts 97. The tray member 51 is sufficiently rigid as to mount the plurality of battery modules 60 thereon, and the battery protector 620 is therefore firmly fixed.

As shown in FIG. 20, the rear wall 621 is inclined forward up in the vertical direction. Moreover, the rear wall 621 is wave-shaped in the vertical direction to improve its rigidity. The upper end of the rear wall 621 extends to the vicinity of the upper end of the cover member 52. The third fan cover plate upper 589 is substantially L-shaped.

The rear wall 621 of the battery protector 620 is inclined forward. Thus, when the rear end of the electric vehicle 10 is subjected to impact due to, for example, collision, the cross member 900 is guided by the rear wall 621 and thereby moved obliquely upward and forward even if the motor 12 and the cross member 900 are moved forward by the collision, as indicated by a two-dot chain line in FIG. 20. Therefore, even if the cross member 900 and the motor 12 are moved forward due to the input of a load from behind, the collision between the cross member 900 and the battery case 50 can be reduced.

Furthermore, the third fan cover plate upper 589 is L-shaped, so that the rigidity of the rear end of the cover member 52 improves. This inhibits the deformation of the rear end of the battery case 50 and therefore inhibits the impact on the battery modules 60 stored in the battery case 50. Thus, possible firing of the battery modules 60 is inhibited.

Moreover, the number of components is reduced by the use of the third fan cover plate upper 589.

Next, the flow of the cooling air inside the battery case 50 is described.

As shown in FIG. 1, when the battery modules 60 are charged, the exhaust fan 551 and the heat exchanger unit 15 are driven so that the cooling air discharged from the heat exchanger unit 15 is guided to the cooling air inlet 86 through the cooling air duct 522.

As shown in FIG. 11, part of the cooling air let in from the cooling air inlet 86 is guided to the bypass exit opening 534 by the forefront rib 523. In this case, as shown in FIG. 10, the cooling air can pass through the cuts 520 formed in the corners 519 of the battery modules 60, so that the flow of the cooling air in the vicinity of the forefront battery module 60 is not blocked. The cooling air which has entered the bypass duct cover 531 from the bypass exit opening 534 bypasses the front battery storage 55 and reaches the bypass entrance opening 535.

The remaining cooling air which does not enter the bypass exit opening 534 passes through the front battery storage 55. At the same time, the cooling air is guided downward by the ribs 523 as indicated by an arrow in FIG. 11. The cooling air flowing downward is guided to the backwardly downwardly inclined front longitudinal partition 503, and flows rearward through a space defined between the bottom wall 505 and the battery cells 512.

At the rear end of the front battery storage 55, the cooling air flowing in from the bypass entrance opening 535 (the cooling air which has bypassed the front battery storage 55) joins the cooling air which has cooled off the battery modules 60 in the front battery storage 55. The joined cooling air passes through the tunnel 532 and the first and second flow paths 533a, 533b and cools off the battery modules 60 in the central battery storages 57, and then enters the rear battery storage 56.

In the rear battery storage 56, the cooling air equally flows toward the first and second outlets 555, 556. The cooling air which has entered the fan cover 552 through the first and second outlets 555, 556 is discharged to the front lower side of the vehicle body 11 through the fan exhaust opening 558, the fan cover outlet 559, the filter 561 and the duct opening 571.

In the battery unit having such a configuration, the front and rear longitudinal partitions 503, 509 are inclined forward and rearward, so that the rigidity of the battery case 50 is assured, and at the same time, the range of the battery module 60 covered with the front and rear longitudinal partitions 503, 509 can be reduced.

Consequently, the area of contact between the cooling air and the battery modules 60 can be increased, and the battery modules 60 can thus be efficiently cooled off.

Moreover, the front longitudinal partition 503 is inclined to become lower backwardly, and the rear longitudinal partition 509 is inclined to become higher backwardly.

Consequently, the cooling air smoothly flows from the cooling air inlet 86 to the first and second outlets 555, 556, and the battery modules 60 are thus efficiently cooled off.

It goes without saying that in carrying out the present invention, appropriate modifications can be made to the components of the electric vehicle of the present invention, including the frame body structure, the battery unit and the beam members.

According to the present invention, it is possible to provide a battery unit capable of maintaining sufficient rigidity of a battery case and also efficient cooling of a battery.

What is claimed is:

1. A battery unit comprising:
    a battery case having an inlet to let in a cooling gas and an outlet to let out the gas; and
    a plurality of battery modules stored and held in the battery case, the battery case including:
        a bottom wall on which the plurality of battery modules are mounted; and
        a partition which is provided on the bottom wall and which separates the battery modules adjacent in a second direction traversing a first direction, the first direction being oriented from a first end of the battery case at which the inlet is formed to a second end at which the outlet is formed, the partition extending along a plane where the battery modules face each other in the second direction along the battery modules and being inclined in the extending direction.

2. The battery unit according to claim 1, wherein the partition becomes gradually lower toward the center of the battery case in the first direction.

3. The battery unit according to claim 1, wherein,
    a plurality of partitions identical to the partition are provided,
    an inlet side battery module group and an outlet side battery module group are arranged in the battery case, the inlet side battery module group including a plurality of battery modules disposed on the side of the first end, the outlet side battery module group including a plurality of battery modules disposed on the side of the second end,
    a partition of the plurality of partitions, which separates the battery modules in the inlet side battery module group becomes gradually lower toward the center of the battery case in the first direction, and
    a partition of the plurality of partitions, which separates the battery modules in the outlet side battery module group becomes gradually lower toward the center of the battery case in the first direction.

* * * * *